(12) United States Patent
Inagaki et al.

(10) Patent No.: US 10,843,943 B2
(45) Date of Patent: Nov. 24, 2020

(54) ELECTROLYTIC LIQUID GENERATION DEVICE

(71) Applicant: Panasonic Intellectual Property Management Co., Ltd., Osaka (JP)

(72) Inventors: Kenichirou Inagaki, Shiga (JP); Atsushi Tsuji, Nara (JP); Chihiro Ii, Shiga (JP); Tetsuya Maekawa, Osaka (JP); Shunsuke Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 16/078,535

(22) PCT Filed: Oct. 4, 2016

(86) PCT No.: PCT/JP2016/004467
§ 371 (c)(1),
(2) Date: Aug. 21, 2018

(87) PCT Pub. No.: WO2017/168475
PCT Pub. Date: Oct. 5, 2017

(65) Prior Publication Data
US 2019/0055144 A1   Feb. 21, 2019

(30) Foreign Application Priority Data
Mar. 30, 2016   (JP) .................. 2016-067581

(51) Int. Cl.
*C02F 1/461*   (2006.01)
*C02F 1/467*   (2006.01)
(Continued)

(52) U.S. Cl.
CPC ........ *C02F 1/46114* (2013.01); *C02F 1/4672* (2013.01); *C02F 1/46104* (2013.01);
(Continued)

(58) Field of Classification Search
CPC ................ C02F 1/46104; C02F 1/4672; C02F 2201/782; C02F 2307/12; C25B 9/00; C25B 9/08
See application file for complete search history.

(56) References Cited

U.S. PATENT DOCUMENTS 5,756,874 A * 5/1998 Steward .................... C25B 9/08
204/255
2015/0129419 A1   5/2015 Sekiguchi et al.

FOREIGN PATENT DOCUMENTS

JP   S64-7268 A    1/1989
JP   H04-131392 A  5/1992
(Continued)

OTHER PUBLICATIONS

International Search Report issued in International Application No. PCT/JP2016/004467 dated Nov. 8, 2016 (with English translation).
(Continued)

*Primary Examiner* — Salil Jain
(74) *Attorney, Agent, or Firm* — McDermott Will & Emery LLP

(57) ABSTRACT

An electrolytic liquid generation device according to the present disclosure includes an electrolytic part and a housing in which the electrolytic part is disposed. The electrolytic part has a laminate including mutually adjacent electrodes and a conductive film interposed between the electrodes. The electrolytic part electrolyzes a liquid. The housing includes an electrode case having a recess with an opening to enable insertion of the electrolytic part through the opening and to contain the electrolytic part in the recess, and an electrode case lid to cover the opening of the electrode case. The electrolytic part is contained in the recess such that lamination direction Z of the laminate is substantially aligned with a direction in which the opening opens. This (Continued)

configuration provides an electrolytic liquid generation device that can be built with improved facility.

20 Claims, 21 Drawing Sheets

(51) Int. Cl.
 *C25B 1/13* (2006.01)
 *C25B 9/00* (2006.01)
 *C25B 9/08* (2006.01)
(52) U.S. Cl.
 CPC .............. *C25B 1/13* (2013.01); *C25B 9/00* (2013.01); *C25B 9/08* (2013.01); *C02F 2001/46147* (2013.01); *C02F 2001/46157* (2013.01); *C02F 2201/46115* (2013.01); *C02F 2201/782* (2013.01); *C02F 2303/14* (2013.01); *C02F 2307/12* (2013.01); *C02F 2307/14* (2013.01)

(56) References Cited

FOREIGN PATENT DOCUMENTS

| | | | | | |
|---|---|---|---|---|---|
| JP | H04131392 | * | 5/1992 | ........... | Y02E 60/366 |
| JP | 2007-136323 A | | 6/2007 | | |
| JP | 2008-189968 A | | 8/2008 | | |
| JP | 2008189968 A | * | 8/2008 | | |
| JP | 2008-279341 A | | 11/2008 | | |
| JP | 2008279341 A | * | 11/2008 | ............... | C25B 1/13 |
| JP | 2012-012695 A | | 1/2012 | | |
| JP | 2014/217820 | * | 11/2014 | | |
| JP | 2014-217820 A | | 11/2014 | | |

OTHER PUBLICATIONS

Extended European Search Report dated Feb. 14, 2020 for the related European Patent Application No. 16896696.8.

* cited by examiner

ELECTROLYTIC LIQUID GENERATION DEVICE

CROSS REFERENCE

This application is the U.S. National Phase under 35 U.S.C. § 371 of International Application No. PCT/JP2016/004467 filed on Oct. 4, 2016, which claims the benefit of Japanese Application No. 2016-067581 filed on Mar. 30, 2016, the entire contents of each are hereby incorporated by reference.

TECHNICAL FIELD

The present disclosure relates to an electrolytic liquid generation device.

BACKGROUND ART

A conventionally known electrolytic liquid generation device (as is disclosed in PTL 1) includes an electrolytic electrode unit made up of an anode, a conductive film, and a cathode and is designed to generate ozone (an electrolytic product) through the electrolytic electrode unit and produce ozone water (an electrolytic liquid).

An electrolytic electrode unit described in PTL 1 has slots that are each made up of a hole formed in a cathode and a hole formed in a conductive film. The electrolytic electrode unit is designed to introduce water into the slots and electrolyze the introduced water.

The conventional art described above enables the formation of an electrolytic liquid generation device including an electrolytic electrode unit that is supported by a support structure formed in piping. Unfortunately, this configuration can complicate the process for building an electrolytic liquid generation device.

CITATION LIST

Patent Literature

PTL 1: Unexamined Japanese Patent Publication No. 2012-012695

SUMMARY OF THE INVENTION

An object of the present disclosure, accomplished to solve the problem in the conventional art described above, is to provide an electrolytic liquid generation device that can be built with improved facility.

An electrolytic liquid generation device according to the present disclosure, accomplished to attain the object described above, includes an electrolytic part and a housing in which the electrolytic part is disposed. The electrolytic part has a laminate including mutually adjacent electrodes and a conductive film interposed between the electrodes. The electrolytic part electrolyzes a liquid.

In the housing, a flow path is formed such that a liquid flowing direction intersects with a lamination direction of the laminate.

The flow path has an inlet and an outlet. The inlet communicates with an external flow path located upstream to allow a liquid to flow into the inlet and be fed to the electrolytic part. The outlet communicates with an external flow path located downstream to allow an electrolytic liquid produced at the electrolytic part to flow out from the outlet.

The electrolytic part has a slot that is open to the flow path and that is formed such that at least a part of interfaces between the conductive film and the respective electrodes is exposed to the slot.

The housing includes an electrode case having a recess with an opening to enable insertion of the electrolytic part through the opening and to contain the electrolytic part in the recess, and an electrode case lid to cover the opening of the electrode case.

The electrolytic part is contained in the recess such that the lamination direction of the laminate is substantially aligned with a direction in which the opening opens.

This configuration according to the present disclosure provides an electrolytic liquid generation device that can be built with improved facility.

DESCRIPTION OF EMBODIMENT

Figure 1:
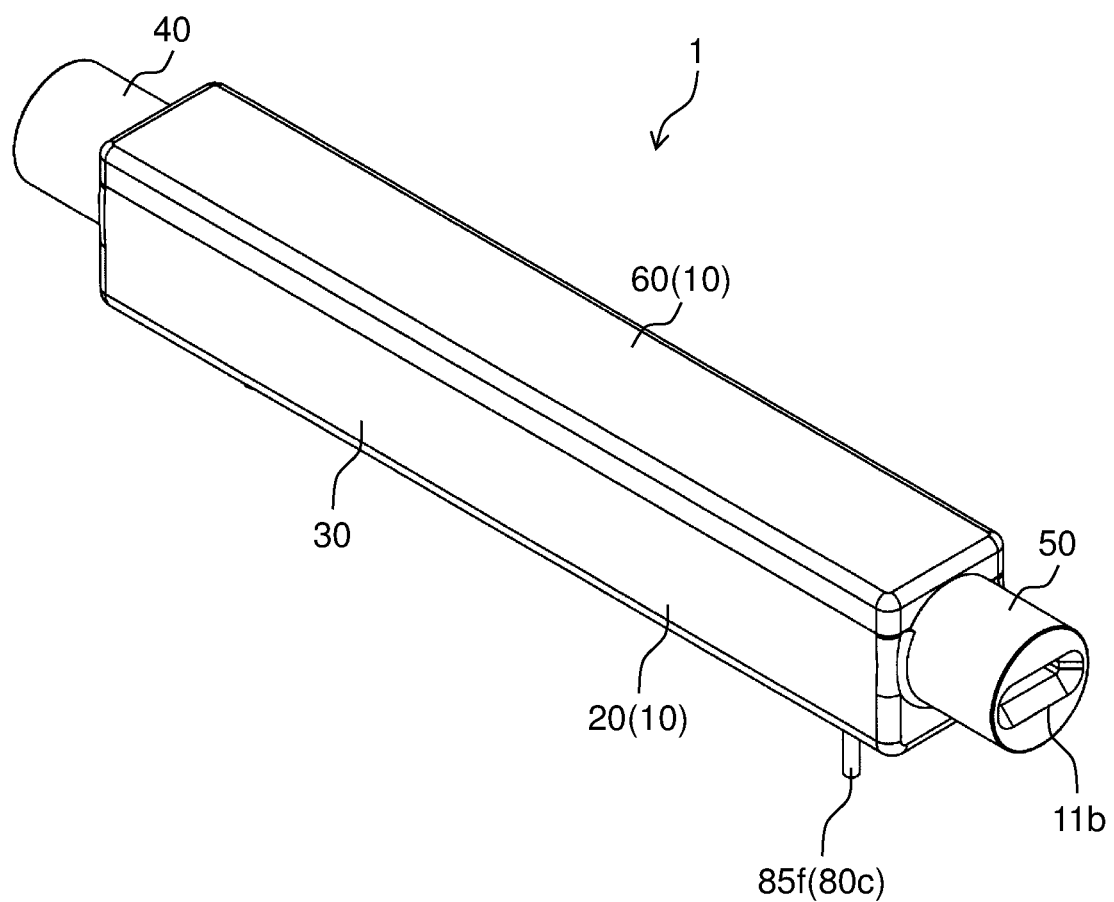
FIG. 1 is a top perspective view of an electrolytic liquid generation device according to an exemplary embodiment of the present disclosure.
Figure 2:
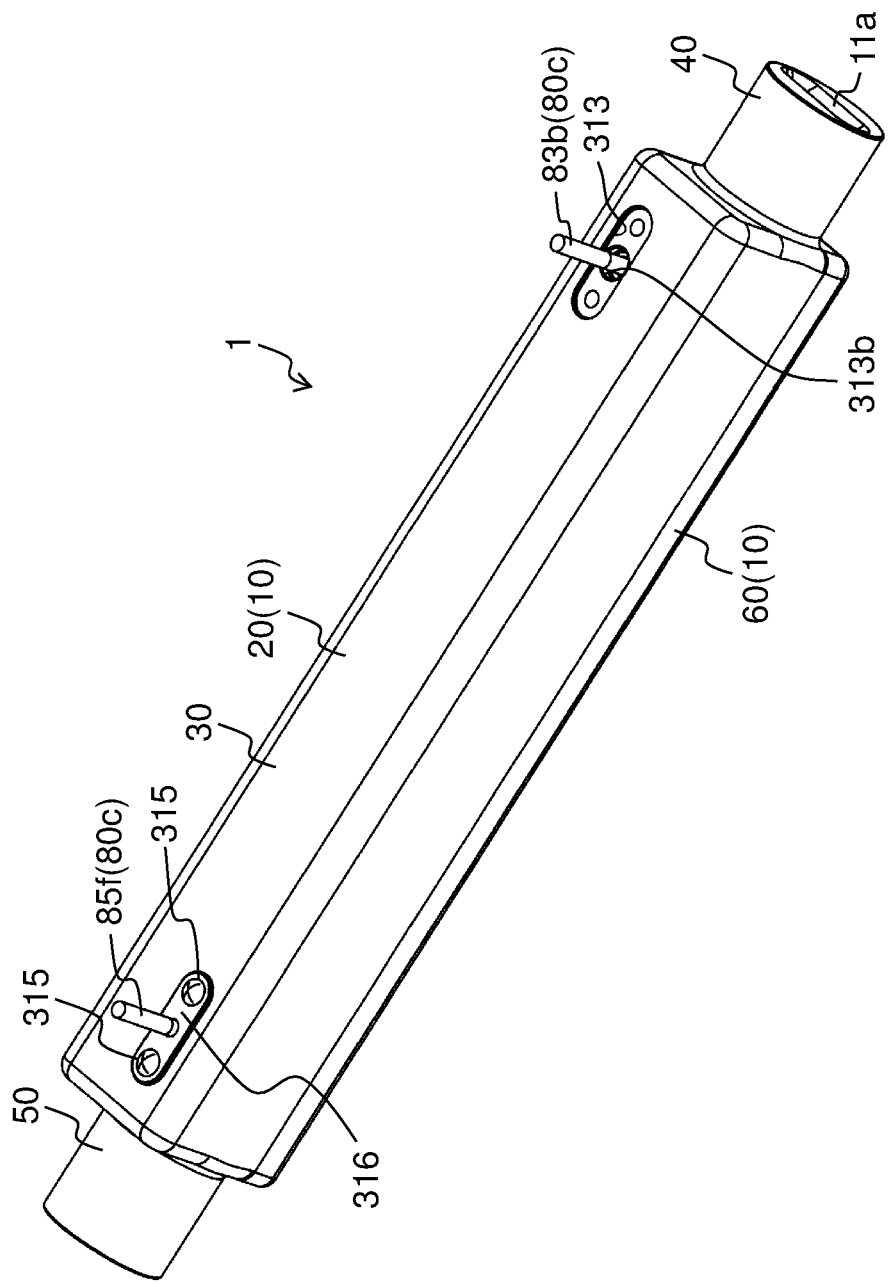
FIG. 2 is a bottom perspective view of the electrolytic liquid generation device according to the exemplary embodiment of the present disclosure.
Figure 3:
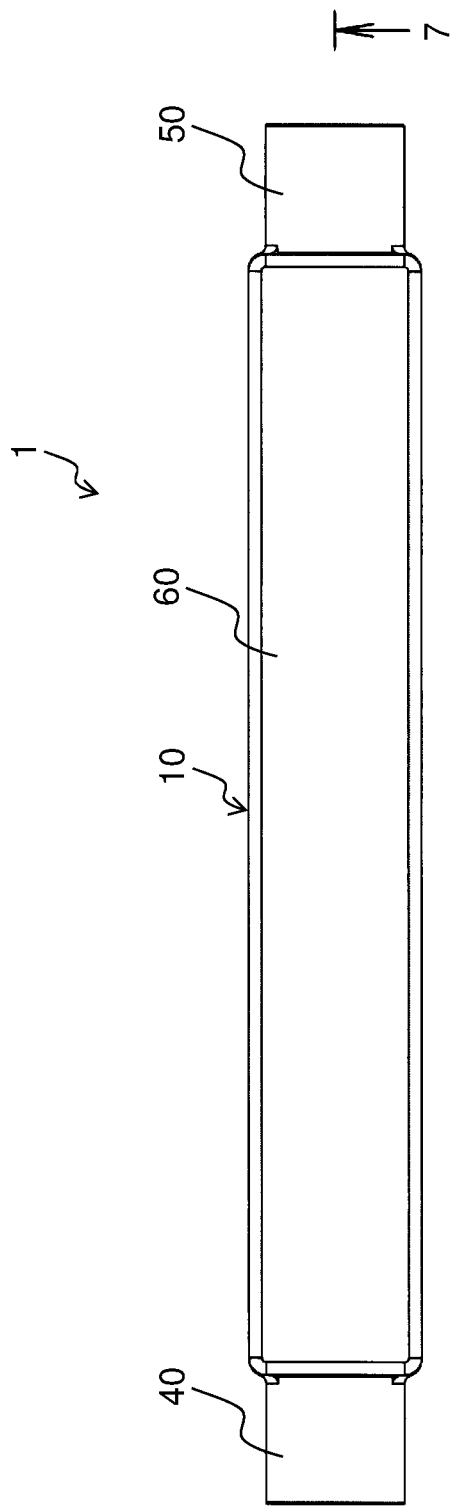
FIG. 3 is a plan view illustrating the electrolytic liquid generation device according to the exemplary embodiment of the present disclosure.

An electrolytic liquid generation device according to an exemplary embodiment of the present disclosure includes an electrolytic part and a housing in which the electrolytic part is disposed. The electrolytic part has a laminate including mutually adjacent electrodes and a conductive film interposed between the electrodes. The electrolytic part electrolyzes a liquid.

In the housing, a flow path is formed such that a liquid flowing direction intersects with a lamination direction of the laminate.

The flow path has an inlet and an outlet. The inlet communicates with an external flow path located upstream to allow a liquid to flow into the inlet and be fed to the electrolytic part. The outlet communicates with an external flow path located downstream to allow an electrolytic liquid produced at the electrolytic part to flow out from the outlet.

The electrolytic part has a slot that is open to the flow path and that is formed such that at least a part of interfaces between the conductive film and the respective electrodes is exposed to the slot.

The housing includes an electrode case having a recess with an opening to enable insertion of the electrolytic part through the opening and to contain the electrolytic part in the recess, and an electrode case lid to cover the opening of the electrode case.

The electrolytic part is contained in the recess such that the lamination direction of the laminate is substantially aligned with a direction in which the opening opens.

This configuration ensures that a direction in which the electrode case lid is attached to the electrode case is substantially aligned with the lamination direction of the laminate. As a result, the electrolytic liquid generation device can be built by shifting components of the electrolytic liquid generation device in the lamination direction. This configuration thus provides an electrolytic liquid generation device that can be built with improved facility.

The flow path is formed between the electrolytic part and the electrode case lid.

This configuration enables the formation of the flow path by covering the opening of the electrode case with the electrode case lid while the electrolytic part is contained in the recess. Consequently, the electrolytic liquid generation device having the flow path can be built with improved facility.

The electrodes and the conductive film are stacked such that at least lateral surfaces of the electrodes and the conductive film extending lengthwise are substantially flush with one another.

As a consequence, the laminate can be put in proper alignment in a widthwise direction of the flow path by ensuring that the lateral surfaces of the components extending lengthwise are substantially flush with one another. This configuration allows the laminate to be put in proper alignment in the widthwise direction of the flow path with improved facility.

The electrode case is provided with an introduction guide that extends in the lamination direction of the laminate and guides insertion of the electrolytic part into the recess.

The introduction guide provided in this way prevents components of the laminate from getting misaligned during a process of building the electrolytic liquid generation device. This configuration enables the electrolytic liquid generation device to be built with improved facility.

An elastic body is disposed in the housing such that the elastic body is in contact with one side of the electrolytic part in the lamination direction of the laminate.

The elastic body disposed in this way is configured to press the one side of the electrolytic part in the lamination direction and compensate for variation in a size of the electrolytic part in the lamination direction. This configuration allows the laminate to be put in proper alignment in the lamination direction with improved facility.

The elastic body is disposed between the electrolytic part and the electrode case.

This configuration allows disposition of the elastic body inside the electrode case and thus enables the electrolytic liquid generation device to be built with improved facility.

A welded part where the electrode case and the electrode case lid are welded together is formed at a periphery of the opening of the electrode case in the housing.

This configuration allows attachment of the electrode case lid to the electrode case with improved facility and thus enables the electrolytic liquid generation device to be built with improved facility.

The electrodes are made up of an anode and a cathode. The electrolytic part further includes an anode power-feeding shaft electrically connected to the anode and a cathode power-feeding shaft electrically connected to the cathode. The anode power-feeding shaft is configured for applying a voltage to the anode, whereas the cathode power-feeding shaft is configured for applying a voltage to the cathode.

The anode power-feeding shaft and the cathode power-feeding shaft extend along the lamination direction.

This configuration allows sizes and positions of components of the electrolytic part to be uniquely defined and thus prevents the components from getting misaligned while the components are stacked. This configuration in turn allows the electrolytic part to be built and the components to be put in proper alignment with improved facility and enables an electrolytic product to be generated with increased stability.

The anode power-feeding shaft and the cathode power-feeding shaft extend to a side opposite to the flow path.

This configuration ensures that the anode and cathode power-feeding shafts are not disposed in the flow path and thus prevents a liquid flowing in the flow path from building up.

One of the anode and cathode power-feeding shafts is disposed on a section of the electrolytic part adjacent to the inlet, and the other of the anode and cathode power-feeding shafts is disposed on a section of the electrolytic part adjacent to the outlet.

This configuration can increase a distance between the anode and cathode power-feeding shafts as large as possible while preventing the electrolytic liquid generation device from increasing in size. This in turn prevents the anode and the cathode from being short-circuited while preventing the electrolytic liquid generation device from increasing in size.

The electrolytic part is substantially rectangular when viewed along the lamination direction, with a lengthwise direction of the electrolytic part aligned with the liquid flowing direction. The anode power-feeding shaft and the cathode power-feeding shaft are disposed on diagonally opposite sections of the electrolytic part.

This configuration requires no distinction between inlet and outlet sides of the electrode case and thus enables the electrolytic liquid generation device to be built with increased efficiency.

At least one of the anode and the cathode power-feeding shafts is provided separately from the respective electrodes.

This configuration eliminates the need for welding the anode power-feeding shaft and/or the cathode power-feeding shaft. This in turn facilitates the processing of the components of the electrolytic part and contributes to cost reduction.

At least one of the components of the electrolytic part is bent in the lamination direction.

This configuration generates stable pressure on the electrodes when the electrolytic liquid generation device is built. This in turn ensures an electricity conduction area with increased stability and improves the stability of the capacity for generating an electrolytic product. This configuration eliminates the need for fastening the electrolytic part disposed in the electrode case with screws or other fasteners and thus prevents the generation of variation in assembly, resulting in improvement in the stability of the capacity for generating an electrolytic product. This contributes to a reduction in a number of components and hence cost reduction.

The slot is formed such that a depth of the slot is less than at least one of an opening length of the slot in the liquid flowing direction and a height of the flow path in the lamination direction.

This configuration prevents a liquid flowing in the flow path from building up in the slot. This contributes to increased concentration of an electrolytic product dissolved in the liquid.

The flow path is formed such that a height of the flow path along the lamination direction is less than a width of the flow path.

This configuration allows a surface flow rate near the interfaces to rise. As a result, a generated electrolytic product can be dissolved with increased speed, and the concentration of the electrolytic product dissolved in the liquid increases.

A projection is in contact with a surface of the electrolytic part adjacent to the flow path.

This configuration enables the projection to press the electrolytic part and thus can maintain contact between the conductive film and the respective electrodes with increased reliability. This improves evenness of density of an electric current flowing through the electrolytic part and thereby improves efficiency in generation of an electrolytic product.

The projection is formed midway between edges of the flow path in a widthwise direction of the flow path.

This configuration enables the projection to press a middle of the electrolytic part and thus improves evenness of contact between the conductive film and the respective electrodes. This improves evenness of density of the electric current flowing through the electrolytic part and thereby improves efficiency in generation of an electrolytic product.

A plurality of the projections is formed side by side along the liquid flowing direction.

This configuration enables the projections to press the electrolytic part along the liquid flowing direction and thus improves evenness of contact between the conductive film and the respective electrodes. This improves evenness of density of the electric current flowing through the electrolytic part and thereby improves efficiency in generation of an electrolytic product.

The projections are formed such that at least a contact portion of each projection in contact with the electrolytic part overlaps no slot in the lamination direction.

This configuration ensures that no projection is disposed over the slot and thereby prevents the projection from interfering with the flow of a liquid in the slot. This prevents the formation of a buildup of air bubbles near the interfaces for the slot and contributes to increased concentration of an electrolytic product dissolved in the liquid.

A plurality of the slots is formed side by side along the liquid flowing direction. At least a contact portion of the projection in contact with the electrolytic part has a length less than a length between the slots adjacent to each other in the electrolytic part in the liquid flowing direction.

This configuration ensures that no projections are disposed over the slots even if the projections are misaligned to some extent at the time of building the electrolytic liquid generation device.

The projection is formed such that a contour of the projection viewed along the lamination direction is a polygon with rounded edges formed at apexes of the projection.

The rounded edges formed at the apexes of the contour of the projection can smooth the flow of a liquid near the projection and thus prevent the formation of a buildup of air bubbles. This configuration contributes to increased concentration of an electrolytic product dissolved in the liquid.

An exemplary embodiment of the present disclosure will now be described with reference to the drawings. The exemplary embodiment should not be construed to limit the scope of the present disclosure.

The following description illustrates an ozone water generator as an electrolytic liquid generation device that generates ozone (an electrolytic product) and dissolves the ozone in water (a liquid) to produce ozone water (an electrolytic liquid). The ozone water is effective in disinfecting things and breaking down organic matter and thus is widely used in water treatment, food, and medical science fields. The ozone water has benefits such as non-persistence and the generation of no by-product.

In the following description, a direction in which a flow path extends is defined as liquid flowing direction (front-rear direction) X; a width direction of the flow path is defined as widthwise direction (flow-path widthwise direction) Y; and a direction in which electrodes and a conductive film are stacked is defined as lamination direction (up-down direction) Z. In the description, up-down direction Z is an up-down direction in which an electrolytic liquid generation device is disposed with an electrode case lid positioned in an upper side of the device.

Exemplary Embodiment

Ozone water generator (electrolytic liquid generation device) 1 according to the present exemplary embodiment includes housing 10 that has flow path 11 formed inside. The ozone water generator is formed such that the ozone water generator can be connected to a midpoint of piping 70 (between upstream pipe 71 and downstream pipe 72) for feeding liquid to an instrument such as an electric device or a liquid refining machine (refer to FIG. 7).

Ozone water generator (electrolytic liquid generation device) 1 is designed to feed ozone water (electrolyzed water: an electrolytic liquid) produced in the generator to an instrument such as an electric device or a liquid refining machine if ozone water generator (electrolytic liquid generation device) 1 is connected to the midpoint of piping 70 and flow path 11 communicates with an external flow path (watercourse 71a in upstream pipe 71 and watercourse 72a in downstream pipe 72).

Ozone water generator (electrolytic liquid generation device) 1 is not necessarily connected to the midpoint of piping 70. For example, a downstream side of ozone water generator (electrolytic liquid generation device) 1 may be directly connected to an instrument such as an electric device or a liquid refining machine. In this case, a flow path formed inside the instrument such as an electric device or a liquid refining machine is equivalent to an external flow path located downstream.

In housing 10 inside which flow path 11 is formed, electrolytic part 80 is disposed so as to face flow path 11. Electrolytic part 80 electrolyzes water (a liquid) flowing through flow path 11.

Figure 20:
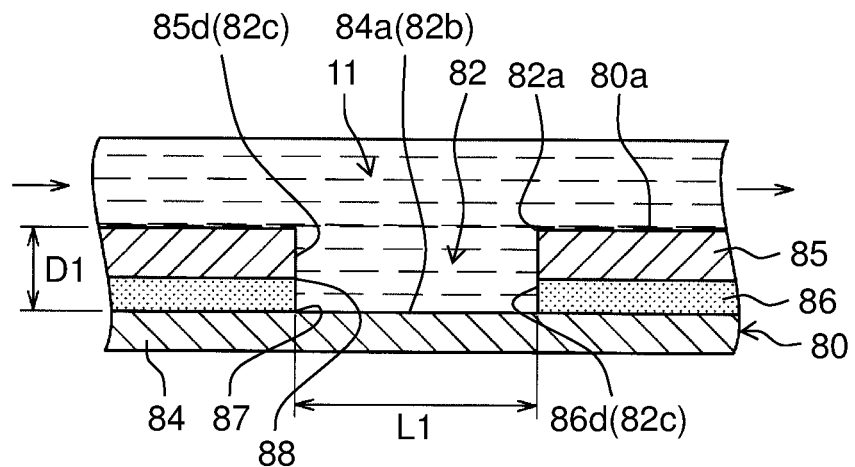
FIG. 20 is a schematic cross-sectional side view illustrating a slot and a flow path in the electrolytic liquid generation device according to the exemplary embodiment of the present disclosure.

In this exemplary embodiment, electrolytic part 80 is disposed in housing 10 such that upper surface 80a (one of surfaces in lamination direction Z) faces flow path 11 (refer to FIG. 20).

Figure 12:
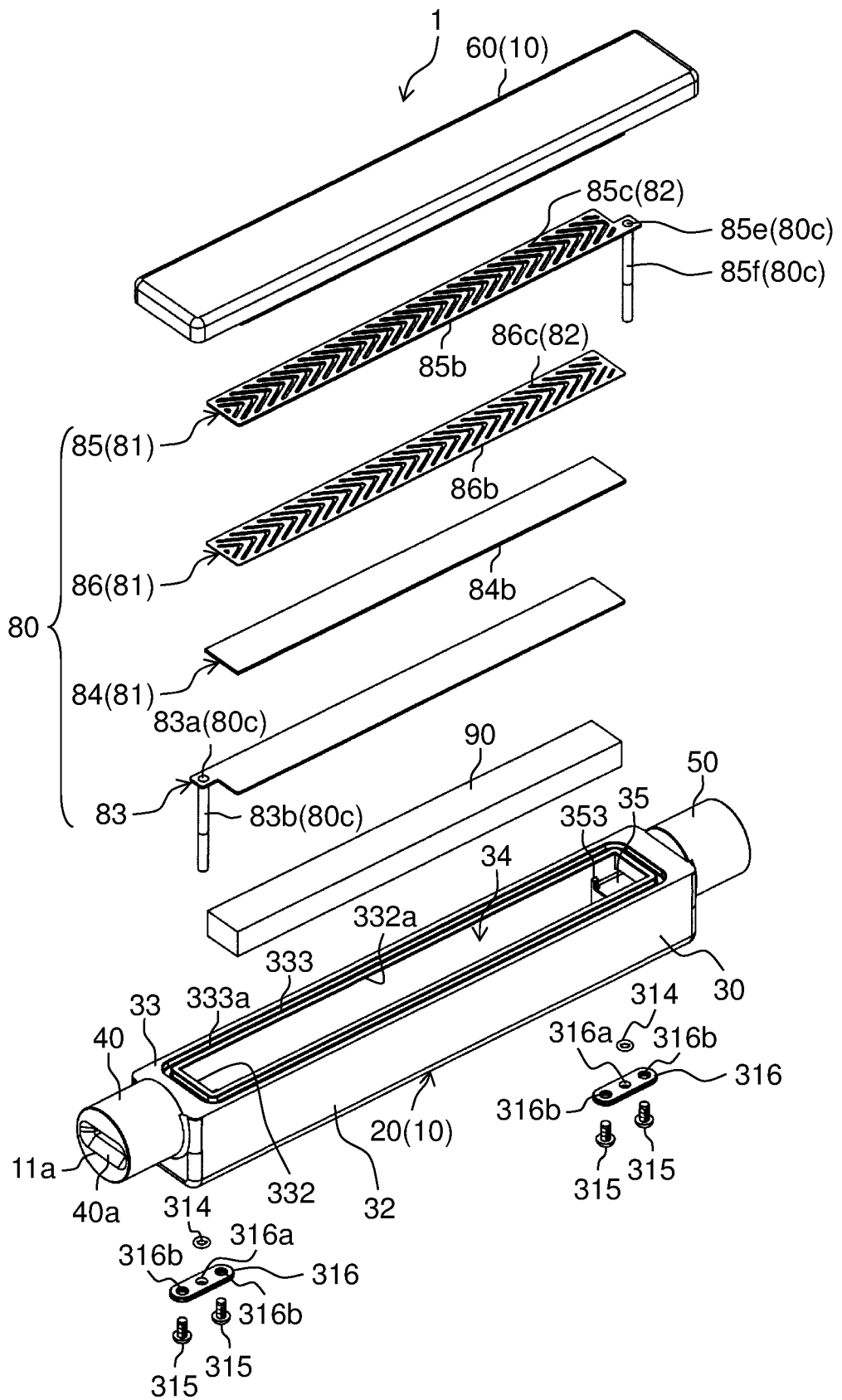
FIG. 12 is an exploded top perspective view of the electrolytic liquid generation device according to the exemplary embodiment of the present disclosure.
Figure 13:
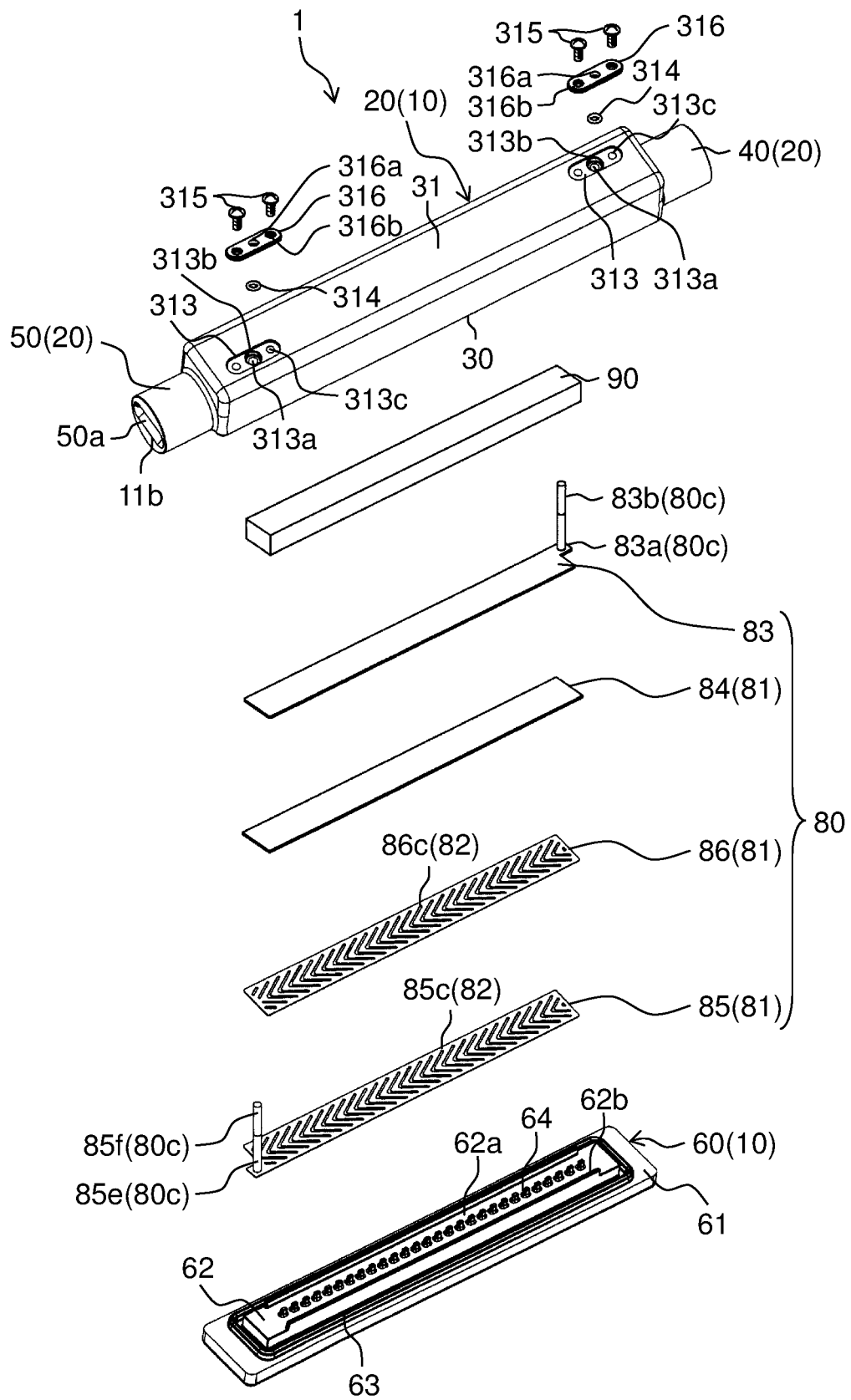
FIG. 13 is an exploded bottom perspective view of the electrolytic liquid generation device according to the exemplary embodiment of the present disclosure.

With reference to FIGS. 12 and 13, electrolytic part 80 has laminate 81 including anode (electrode) 84 and cathode (electrode) 85 (that are adjacent to each other) and conductive film 86 interposed between the electrodes.

Meanwhile, flow path 11 is formed in housing 10 such that liquid flowing direction X intersects with lamination direction Z of laminate 81.

Flow path 11 has inlet 11a and outlet 11b. The inlet communicates with watercourse 71a in upstream pipe 71 (an external flow path located upstream) to allow a liquid to flow into the inlet and be fed to electrolytic part 80. The outlet communicates with watercourse 72a in downstream pipe 72 (an external flow path located downstream) to allow ozone water (an electrolytic liquid) produced at electrolytic part 80 to flow out from the outlet.

Laminate 81 has slot 82 that is open to flow path 11 and that is formed such that at least a part of interfaces 87, 88 between conductive film 86 and the respective electrodes (anode 84 and cathode 85) is exposed to the slot (refer to FIG. 20).

In this exemplary embodiment, such slots 82 are formed in laminate 81 to allow water (a liquid) fed into flow path 11 via inlet 11a to be introduced into slots 82.

The electrolytic part mainly electrolyzes water (a liquid) introduced into slots 82 to cause an electrochemical reaction by electric power supplied from power source 100 such that ozone water (electrolyzed water: an electrolytic liquid) containing dissolved ozone (an electrolytic product) is produced.

As described above, ozone water generator (electrolytic liquid generation device) 1 according to the present exemplary embodiment electrolyzes water (a liquid) to cause an electrochemical reaction and thereby produces ozone water (electrolyzed water: an electrolytic liquid) containing dissolved ozone (an electrolytic product).

Ozone water (electrolyzed water: an electrolytic liquid) produced in ozone water generator (electrolytic liquid generation device) 1 flows through flow path 11 and is discharged from outlet 11b into an outside (watercourse 72a in downstream pipe 72) of ozone water generator (electrolytic liquid generation device) 1.

Housing 10 is formed from a non-conductive resin such as an acrylic resin, for example. The housing includes electrode case 20 having recess 34 with opening 332a to enable insertion of electrolytic part 80 through the opening and to contain electrolytic part 80 in recess 34, and electrode case lid 60 to cover opening 332a of electrode case 20 (refer to FIGS. 12 and 13).

Figure 14:
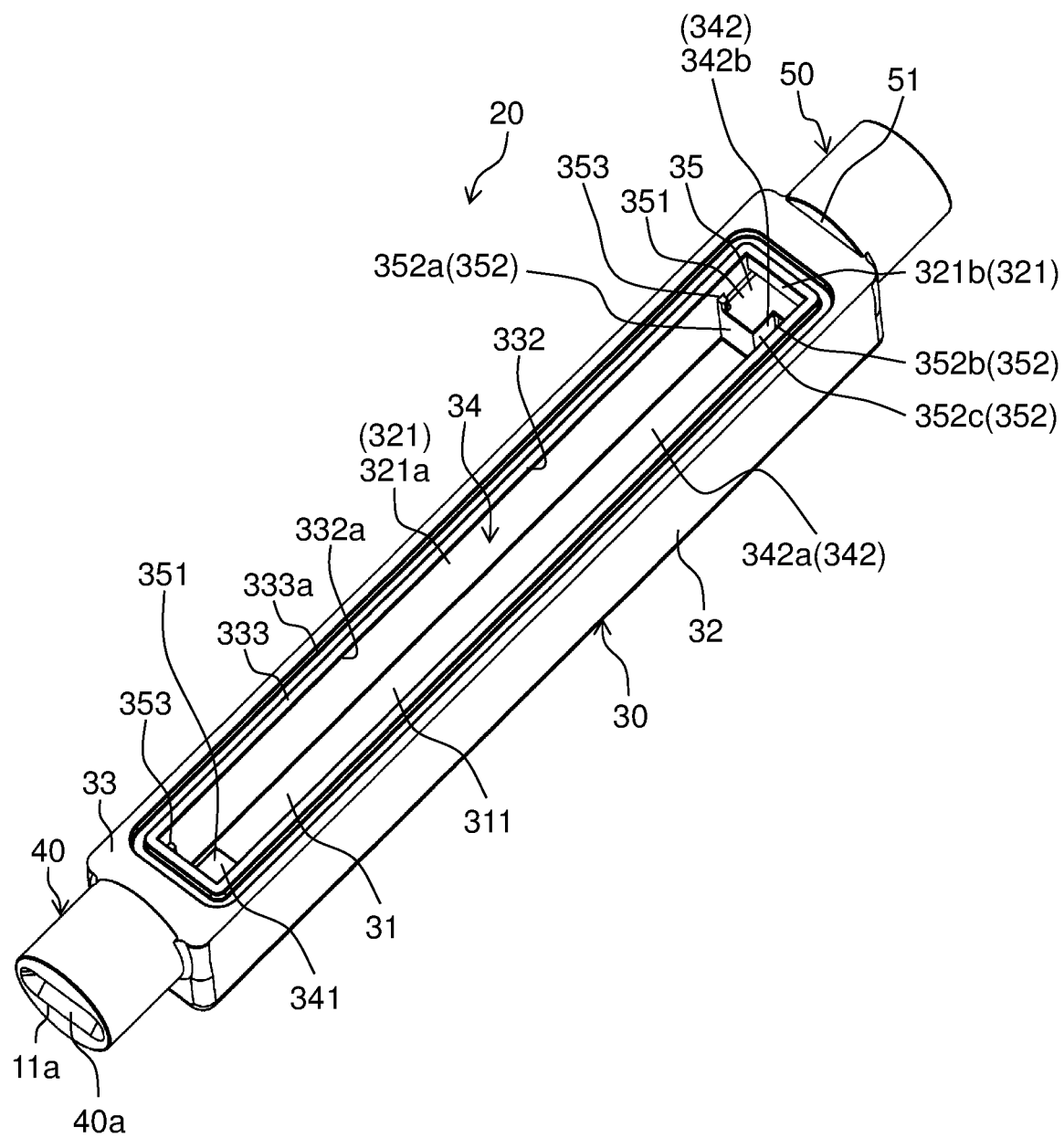
FIG. 14 is a first side perspective view of an electrode case of the electrolytic liquid generation device according to the exemplary embodiment of the present disclosure.
Figure 15:
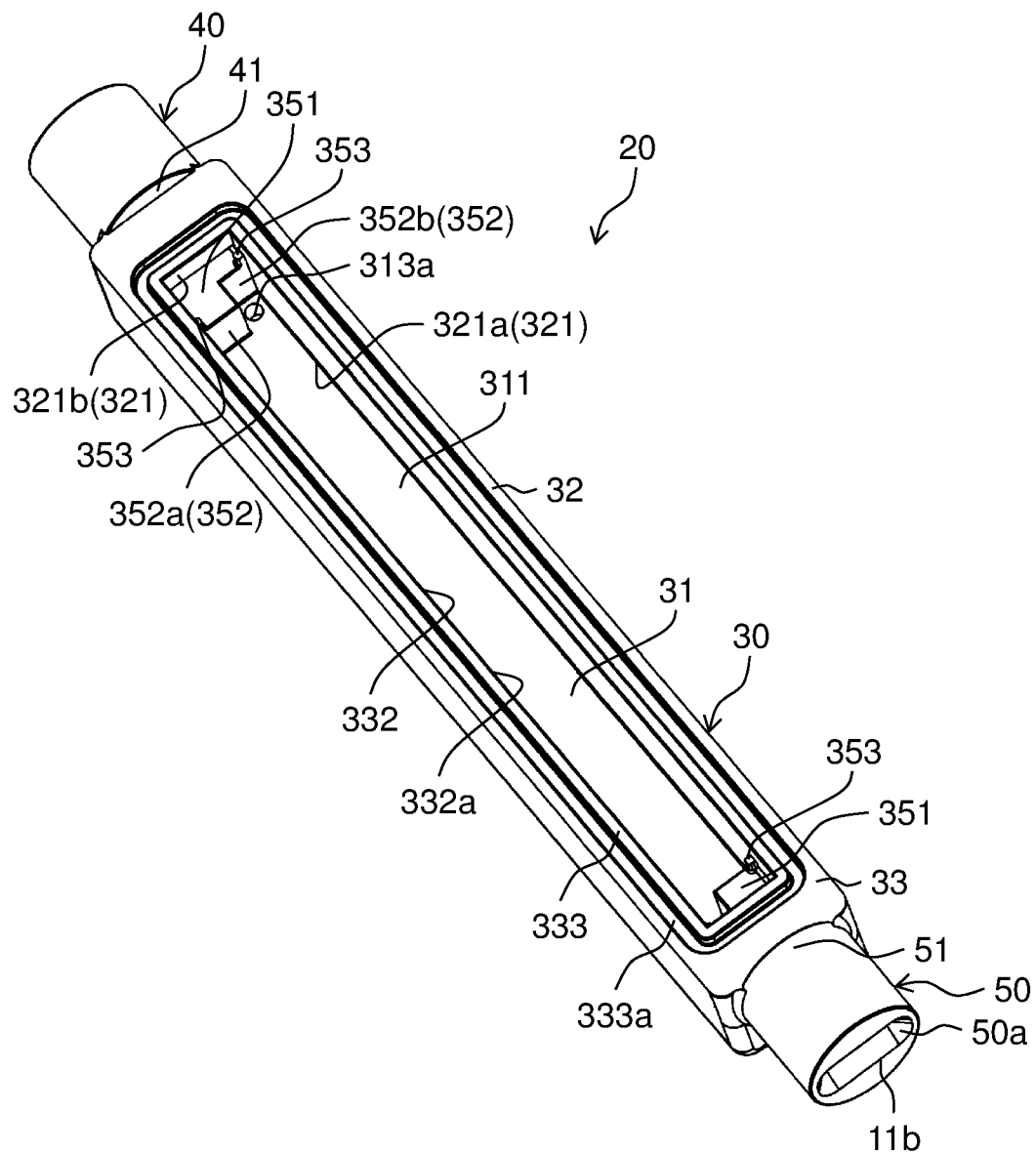
FIG. 15 is a second side perspective view of the electrode case of the electrolytic liquid generation device according to the exemplary embodiment of the present disclosure.

With reference to FIGS. 14 and 15, electrode case 20 includes substantially hollow and boxy main body 30 in which electrolytic part 80 is disposed. At one side (an upstream side) of main body 30 in a lengthwise direction (liquid flowing direction: front-rear direction X), first joint (upstream joint) 40 that is substantially cylindrical is formed to connect with upstream pipe 71.

At the other side (a downstream side) of main body 30 in the lengthwise direction (liquid flowing direction: front-rear direction X), second joint (downstream joint) 50 that is substantially cylindrical is formed to connect with downstream pipe 72.

Figure 7:
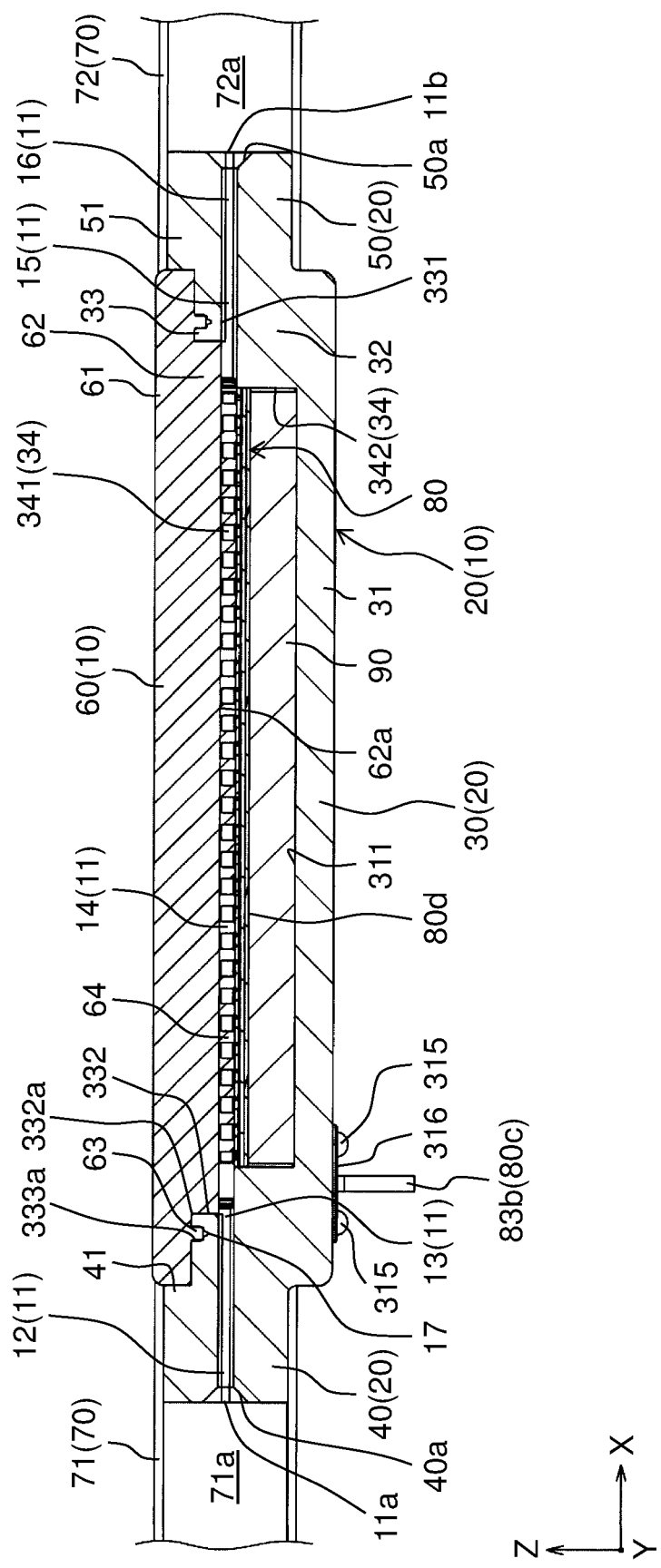
FIG. 7 is a cross-sectional view taken along line 7-7 of FIG. 3.

First joint (upstream joint) 40 has first joint flow path (upstream flow path) 12 that is formed to communicate with watercourse 71a of upstream pipe 71 while first joint (upstream joint) 40 is connected to upstream pipe 71 (refer to FIG. 7). In this exemplary embodiment, first joint flow path (upstream flow path) 12 constitutes a part of flow path 11. An upstream end of first joint flow path (upstream flow path) 12 is equivalent to inlet 11a. Tapered portion 40a whose cross section gets wider along with an upstream shift of the cross section is formed at an upstream end of first joint (upstream joint) 40. Accordingly, in this exemplary embodiment, inlet 11a is formed so as to be wider in cross section than a downstream side of first joint flow path (upstream flow path) 12.

Meanwhile, second joint (downstream joint) 50 has second joint flow path (downstream flow path) 16 that is formed to communicate with watercourse 72a of downstream pipe 72 while second joint (downstream joint) 50 is connected to downstream pipe 72 (refer to FIG. 7). Similarly, in this exemplary embodiment, second joint flow path (downstream flow path) 16 constitutes a part of flow path 11. A downstream end of second joint flow path (downstream flow path) 16 is equivalent to outlet 11b. Tapered portion 50a whose cross section gets wider along with a downstream shift of the cross section is formed at a downstream end of second joint (downstream joint) 50. Accordingly, in this exemplary embodiment, outlet 11b is formed so as to be wider in cross section than an upstream side of second joint flow path (downstream flow path) 16.

In this exemplary embodiment, upper ends 41, 51 (ends adjacent to electrode case lid 60) of respective first joint (upstream joint) 40 and second joint (downstream joint) 50 are formed so as to project upward relative to main body 30. Accordingly, upper ends 41, 51 project upward relative to main body 30 and thus electrode case lid 60 is clamped between upper ends 41 and 51 when electrode case lid 60 is attached to electrode case 20.

With reference to FIGS. 14 and 15, main body 30 includes bottom wall 31, peripheral wall 32 joined to a periphery of bottom wall 31, and top wall 33 joined to an upper end of peripheral wall 32. In top wall 33, through-hole 332 that passes through along up-down direction Z is formed.

Inside main body 30, recess 34 is defined and formed by inner surface 311 for bottom wall 31, inner surface 321, i.e., widthwise-direction inner surface 321a and lengthwise-direction surface 321b for peripheral wall 32, and inner surface 331 for top wall 33. Accordingly, in this exemplary embodiment, recess 34 is formed so as to have an opening at its upper end. As a result, opening 332a formed in top wall 33 is equivalent to the opening of recess 34.

Electrolytic part 80 is inserted into recess 34 via opening 332a so that electrolytic part 80 is contained in recess 34. Opening 332a is formed so as to be larger than a contour of electrolytic part 80 viewed along lamination direction Z. Electrolytic part 80 can be inserted into recess 34 with the lamination direction of the electrolytic part aligned with up-down direction Z.

In this exemplary embodiment, tiers 35 are formed at respective both ends of inner main body 30 in the lengthwise direction (liquid flowing direction: front-rear direction X).

Tier parts 35 integrate with bottom wall 31 and peripheral wall 32, and are positioned between inner surface 311 for bottom wall 31 and opening 332a in up-down direction Z. Tier parts 35 each include intermediate surface 351 that extends horizontally and tier surface 352 that extends perpendicularly and connects intermediate surface 351 with inner surface 311 for bottom wall 31.

With such tier parts 35 formed, recess 34 has a two-tier recess structure.

Specifically, recess 34 includes first recess (space assigned for flow path formation) 341 that is formed adjacent to the opening and configured to form a part of flow path 11 and second recess (electrolytic part containable space) 342 that is formed at a deeper side of (below) first recess (space assigned for flow path formation) 341 and configured to contain electrolytic part 80.

Second recess (electrolytic part containable space) 342 includes main-body containable recess 342a configured to contain main body 80b of electrolytic part 80 and power-feeder containable spaces 342b that are joined to respective both ends of main-body containable recess 342a in the lengthwise direction (liquid flowing direction: front-rear direction X) at one side of widthwise direction Y and that are configured to contain later-described power feeders 80c of electrolytic part 80.

In other words, tier surface 352 of tier part 35 includes inner tier surface 352a located at an inner side in the lengthwise direction (liquid flowing direction: front-rear direction X), outer tier surface 352b located at an outer side in the lengthwise direction (liquid flowing direction: front-rear direction X), linkage tier surface 352c connecting inner tier surface 352a with outer tier surface 352b. Intermediate surface 351 is formed such that an inside edge of the intermediate surface in the lengthwise direction (liquid flowing direction: front-rear direction X) is bent like a crank as viewed along up-down direction Z.

Accordingly, in this exemplary embodiment, first recess (space assigned for flow path formation) 341 is defined by inner surface 331 for top wall 33, an upper portion of widthwise-direction inner surface 321a and lengthwise-direction inner surface 321b for peripheral wall 32, and intermediate surfaces 351 of tier parts 35.

Second recess (electrolytic part containable space) 342 is defined by inner surface 311 for bottom wall 31, tier surface 352 of tier parts 35, and a lower portion of widthwise-direction inner surface 321a.

As described above, electrolytic part 80 is contained in second recess (electrolytic part containable space) 342. Thus, electrolytic part 80 is contained with the lamination direction of the electrolytic part aligned with up-down direction Z.

In this exemplary embodiment, electrolytic part 80 with elastic body 90 put beneath are contained in second recess (electrolytic part containable space) 342. In other words, electrolytic part 80 is contained in second recess (electrolytic part containable space) 342, with elastic body 90 interposed between electrolytic part 80 and electrode case 20 and elastic body 90 put into contact with undersurface 80d of electrolytic part 80. Elastic body 90 is, for example, formed from a material having elasticity such as rubber, plastic, or a metallic spring.

In this exemplary embodiment, when electrode case lid 60 is attached to electrode case 20, electrolytic-part flow path 14 is formed above upper surface 80a (one of surfaces in lamination direction Z) of electrolytic part 80 and above intermediate surfaces 351. Accordingly, in this exemplary embodiment, flow path 11 is formed between electrolytic part 80 and electrode case lid 60.

In this exemplary embodiment, the inside edge of intermediate surface 351 of each of tier parts 35 in the lengthwise direction (liquid flowing direction: front-rear direction X) is provided with upward projecting guides (introduction guides) 353 that are formed at both ends of the inside edge in widthwise direction Y. In other words, four corners of second recess (electrolytic part containable space) 342 are provided with projecting guides (introduction guides) 353 that guide insertion of electrolytic part 80 into second recess (electrolytic part containable space) 342.

First main-body flow path 13 communicating with first joint flow path (upstream flow path) 12 is formed in one side (an upstream side) of peripheral wall 32 along the lengthwise direction (liquid flowing direction: front-rear direction X). Second main-body flow path 15 communicating with second joint flow path (downstream flow path) 16 is formed in the other side (a downstream side) of peripheral wall 32 along the lengthwise direction (liquid flowing direction: front-rear direction X).

Accordingly, in this exemplary embodiment, flow path 11 is formed of first joint flow path (upstream flow path) 12, first main-body flow path 13, electrolytic-part flow path 14, second main-body flow path 15, and second joint flow path (downstream flow path) 16 (refer to FIG. 7). At the same time, flow path 11 is formed such that the cross-sectional area is substantially uniform across flow path 11 excluding a portion for formation of inlet 11a and a portion for formation of outlet 11b.

Figure 6:
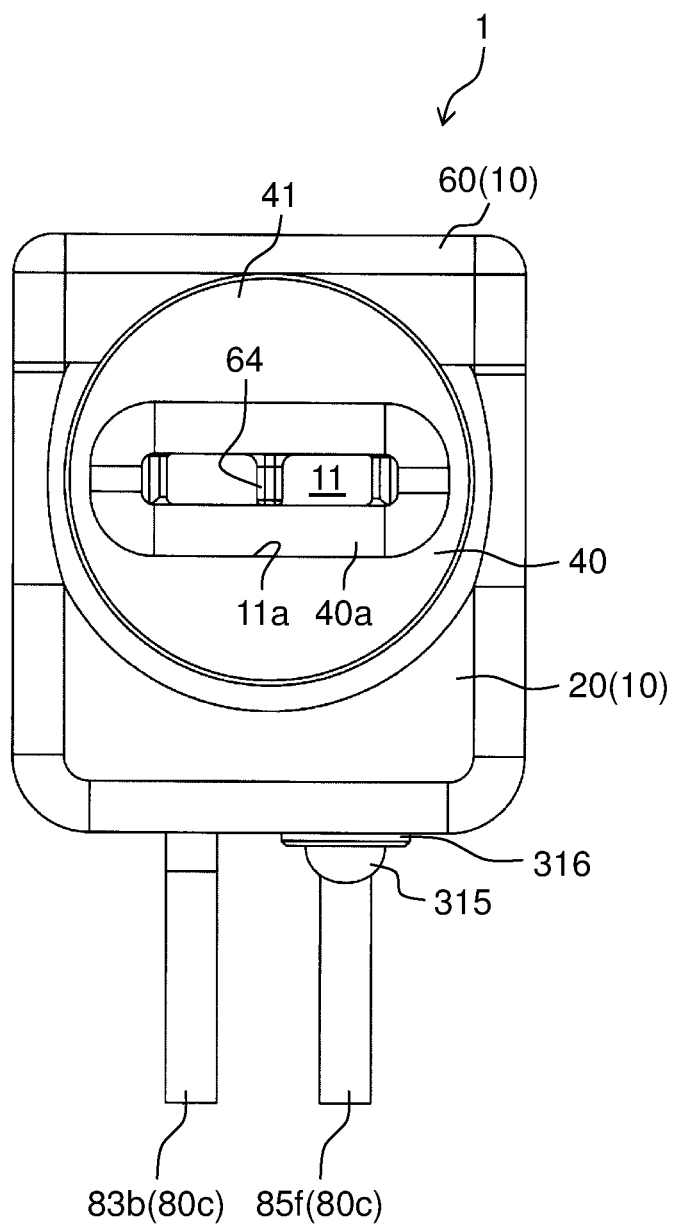
FIG. 6 is an elevation view illustrating the electrolytic liquid generation device according to the exemplary embodiment of the present disclosure.
Figure 8:
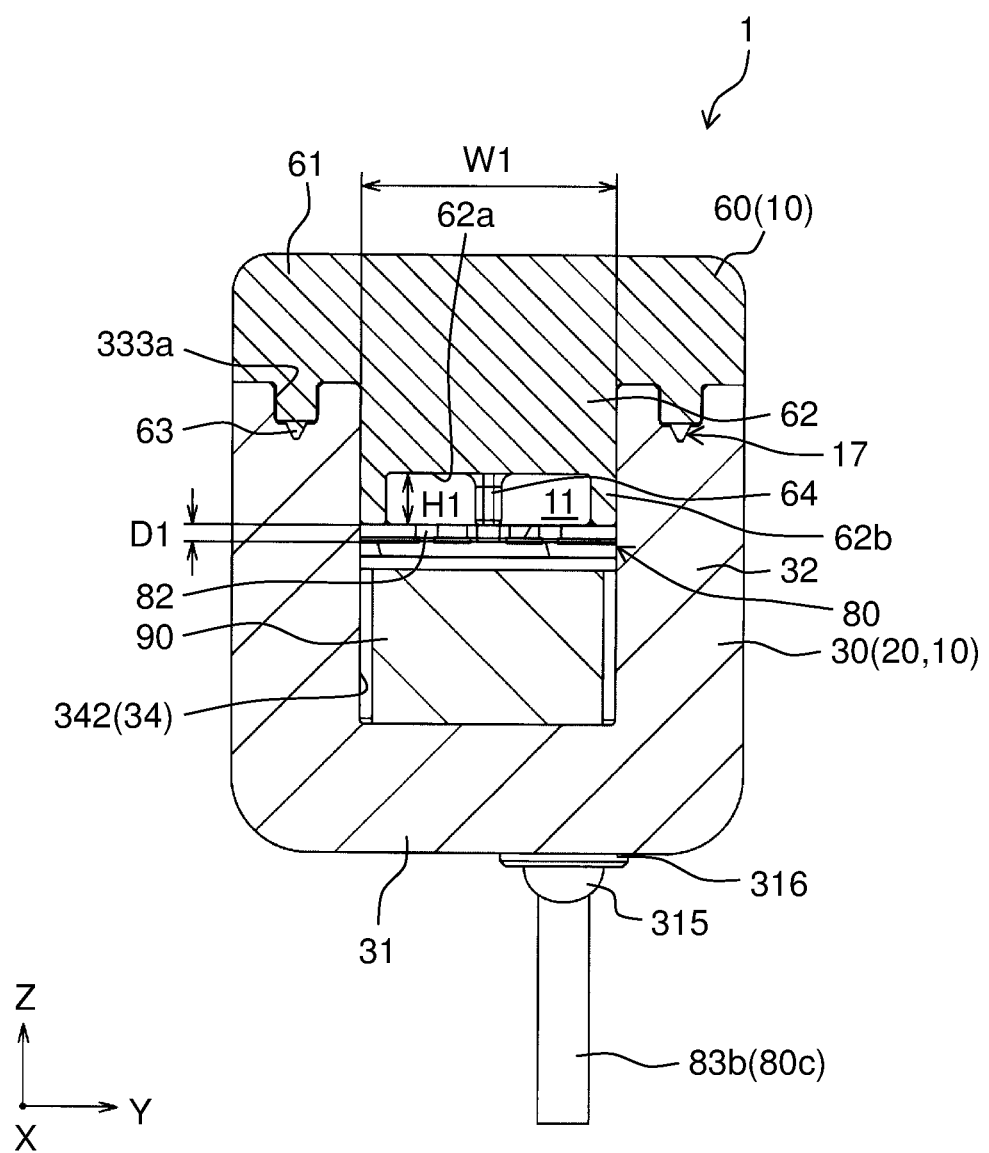
FIG. 8 is a cross-sectional view taken along line 8-8 of FIG. 4.
Figure 9:
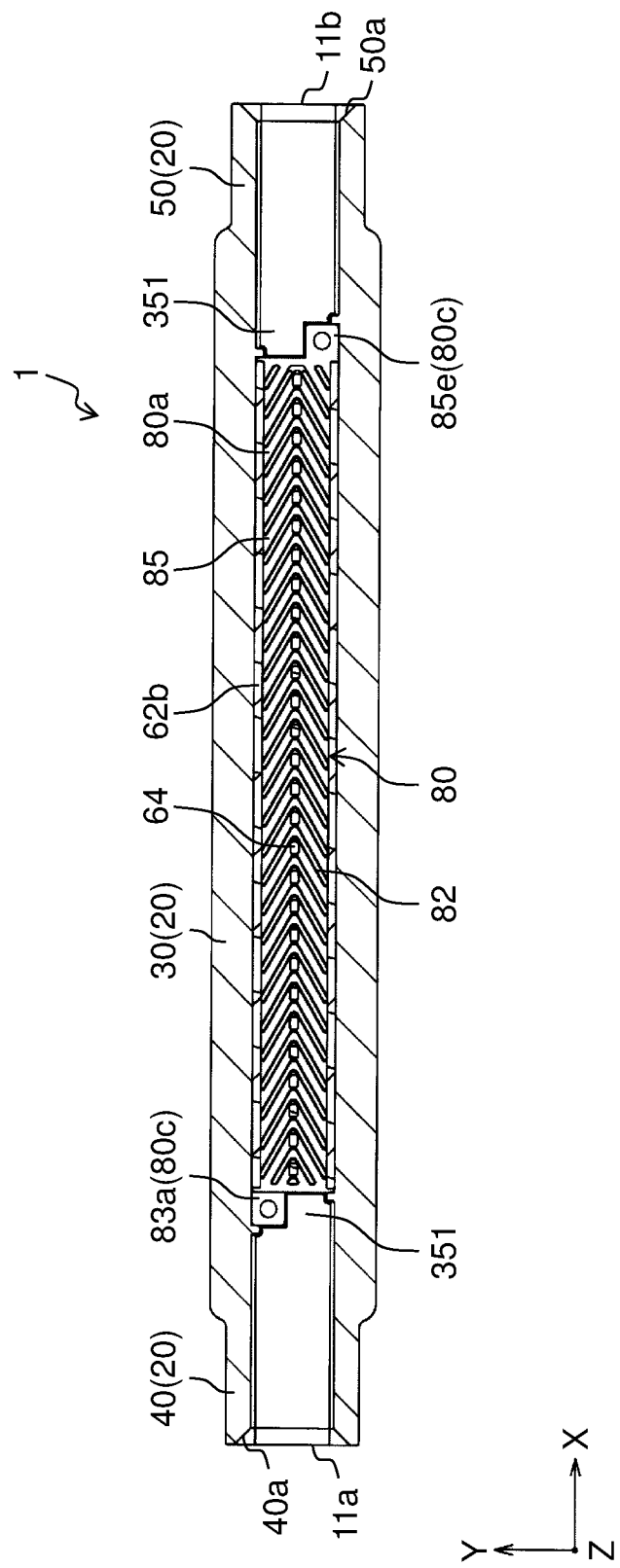
FIG. 9 is a cross-sectional view taken along line 9-9 of FIG. 4.
Figure 10:
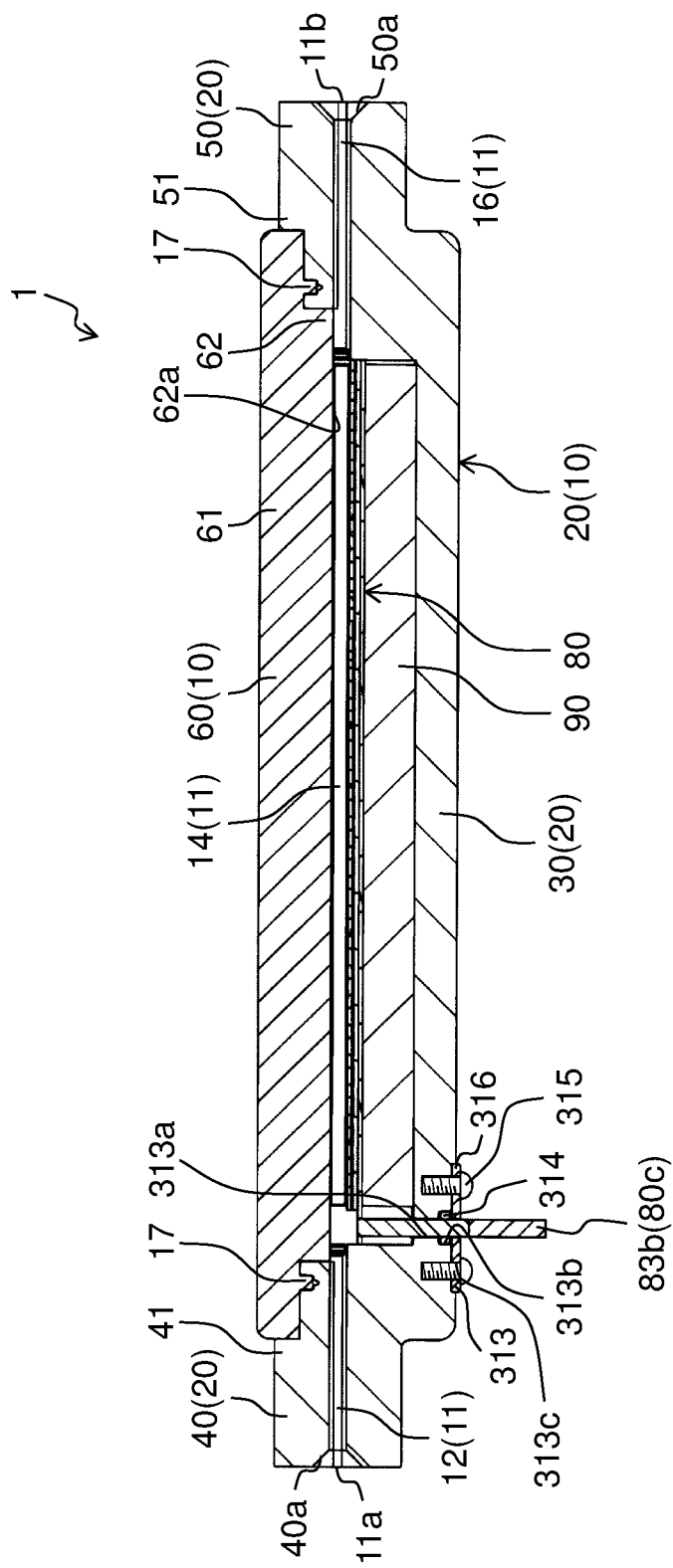
FIG. 10 is a cross-sectional view taken along line 10-10 of FIG. 5.
Figure 11:
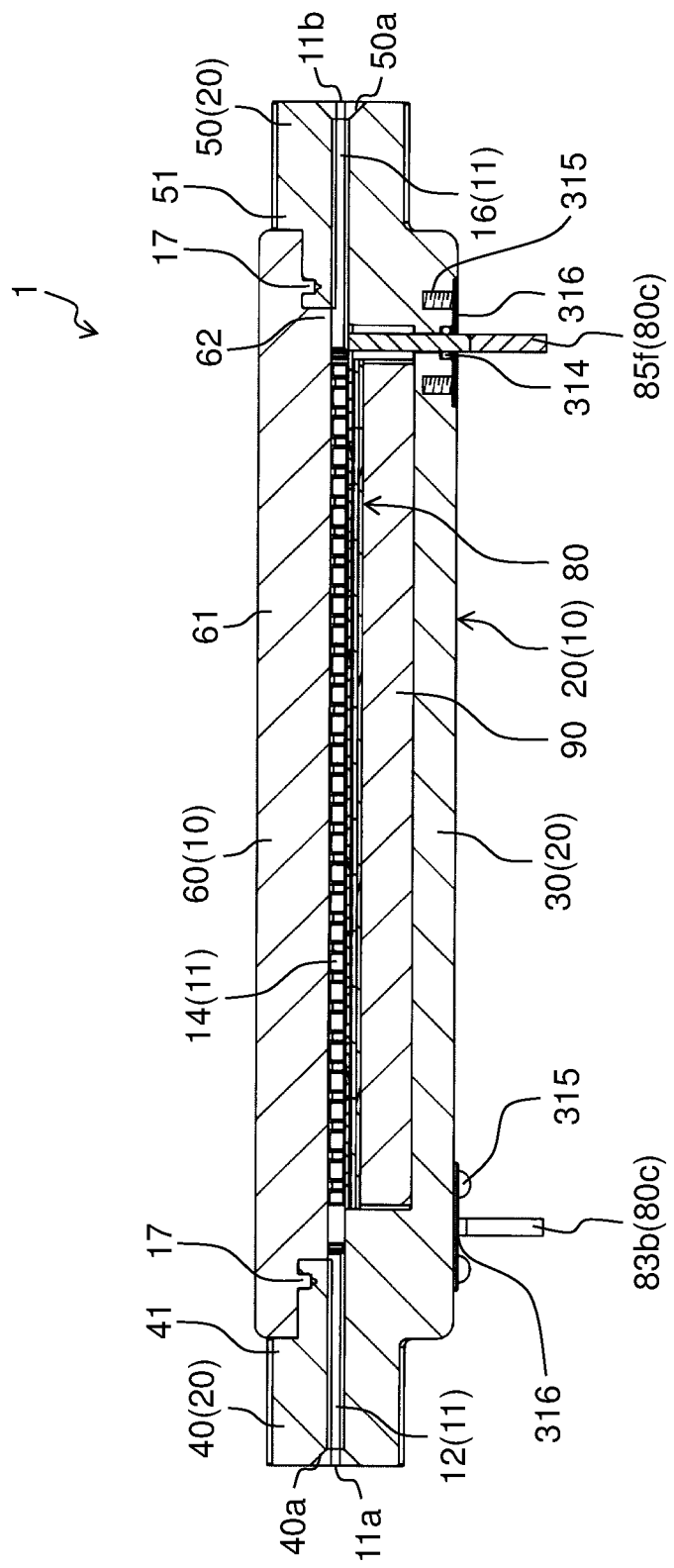
FIG. 11 is a cross-sectional view taken along line 11-11 of FIG. 5.

With reference to FIGS. 6 and 8, flow path 11 is shaped like a rectangle that is broad in widthwise direction Y. In other words, flow path 11 is formed such that flow path height H1 along lamination direction Z is less than flow path width W1. In this exemplary embodiment, flow path 11 is formed such that flow path width W1 is about 10 mm and height H1 along lamination direction Z is about 2 mm. Consequently, if water (a liquid) with a flow rate of 2 liters/min is fed into flow path 11, for example, water (a liquid) flows through the flow path at a velocity of about 1.67 m/s.

In this exemplary embodiment, power-feeder containable space 342b located at one side (an upstream side) in the lengthwise direction (liquid flowing direction: front-rear direction X) is formed at one side in widthwise direction Y, whereas power-feeder containable space 342b located at the other side (a downstream side) in the lengthwise direction (liquid flowing direction: front-rear direction X) is formed at the other side in widthwise direction Y. In other words, a pair of power-feeder containable spaces 342b is formed at diagonally opposite locations of main-body containable recess 342a.

Thus, in this exemplary embodiment, recess 34 is symmetric with respect to a central point of main body 30 when viewed along up-down direction Z.

In this exemplary embodiment, housing 10 (electrode case 20 and electrode case lid 60) is also symmetric with respect to a central point of housing 10 when viewed along up-down direction Z.

Electrode case lid 60 includes substantially rectangular, plate-shaped lid body 61 and fitting projection 62 that projects downward from a bottom center of plate-shaped lid body 61 and fits into opening 332a in electrode case 20.

Welding projection 63 projecting downward is formed at an entire periphery of fitting projection 62 for plate-shaped lid body 61. This welding projection 63 is designed to be inserted in groove 333a that is formed at entire periphery 333 of opening 332a in top wall 33 of electrode case 20, when electrode case lid 60 is attached to electrode case 20.

Electrode case lid 60 and electrode case 20 are welded together by vibration welding, heat welding, or other welding with fitting projection 62 fitting in opening 332a and welding projection 63 being inserted in groove 333a, so that recess 34 in electrode case 20 is sealed with electrode case lid 60. At the same time, welded part 17 is formed at an interface between welding projection 63 and groove 333a.

Electrode case lid 60 may be fastened to electrode case 20 with screws with a sealing material interposed between electrode case lid 60 and electrode case 20, so that recess 34 in electrode case 20 is sealed with electrode case lid 60.

Extending walls 62b extending along the lengthwise direction (liquid flowing direction: front-rear direction X) are formed at both ends of undersurface 62a of fitting projection 62 in widthwise direction Y. Both ends of electrolytic-part flow path 14 in widthwise direction Y are defined by these extending walls 62b, when electrode case lid 60 is attached to electrode case 20.

In this exemplary embodiment, extending walls 62b are disposed inward of projecting guides (introduction guides) 353 provided at four corners of second recess (electrolytic part containable space) 342 in the lengthwise direction (liquid flowing direction: front-rear direction X). Extending walls 62b are formed so as to overlap projecting guides (introduction guides) 353 as viewed along the lengthwise direction (liquid flowing direction: front-rear direction X).

In this exemplary embodiment, extending walls 62b provided in this way serve to prevent a turbulent flow from occurring near projecting guides (introduction guides) 353.

A plurality of projections 64 is formed side by side along the lengthwise direction (liquid flowing direction: front-rear direction X) at a middle of undersurface 62a of fitting projection 62 in widthwise direction Y.

Projections 64 provided on electrode case lid 60 press electrolytic part 80 downward, when electrolytic part 80 with elastic body 90 put beneath is contained in second recess (electrolytic part containable space) 342 and electrode case lid 60 is attached to electrode case 20.

Accordingly, in this exemplary embodiment, electrolytic part 80 is pressed downward and hence elastic body 90 helps to apply pressure evenly to entire electrolytic part 80, so that improved adhesion is provided between components of electrolytic part 80.

Upper surface (one of surfaces in lamination direction Z) 80a of electrolytic part 80 is substantially flush with intermediate surfaces 351, when electrode case lid 60 is attached to electrode case 20. This configuration prevents formation of a level difference inside flow path 11. This configuration also ensures that a cross-sectional area of a flow path (electrolytic-part flow path 14) formed above electrolytic part 80 is substantially equal to cross-sectional areas of other flow paths.

Accordingly, the substantially uniform cross-sectional area of flow path 11 prevents the occurrence of turbulence in water (a liquid) flowing through flow path 11.

This configuration hampers the generation of a water built-up zone in flow path 11 and prevents generated ozone (an electrolytic product) from growing into bubbles. This contributes to increased concentration of ozone (an electrolytic product) in ozone water (an electrolytic liquid) discharged from outlet 11b.

A specific configuration of electrolytic part 80 will now be described.

Figure 16:
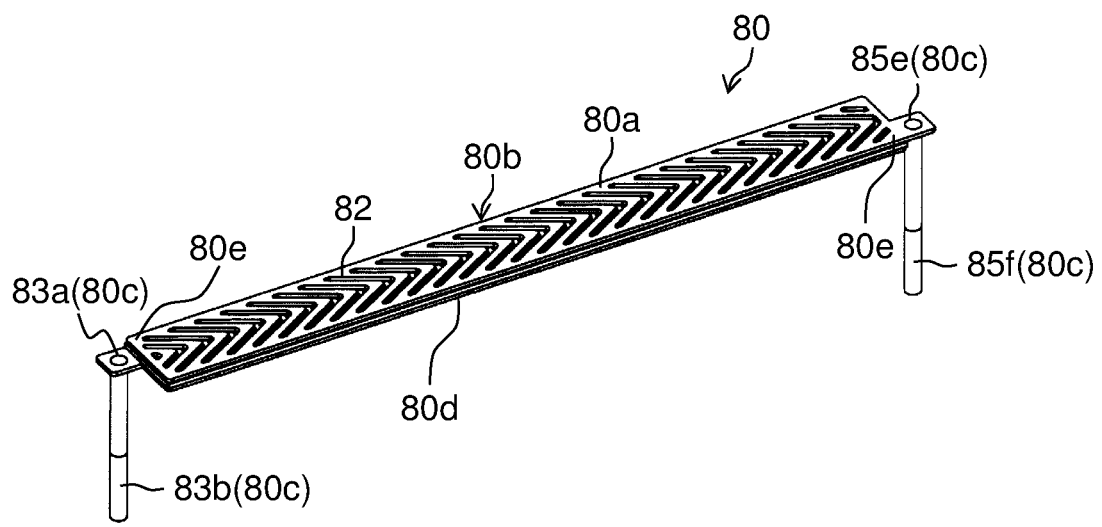
FIG. 16 is a perspective view illustrating an electrolytic part of the electrolytic liquid generation device according to the exemplary embodiment of the present disclosure.
Figure 17:
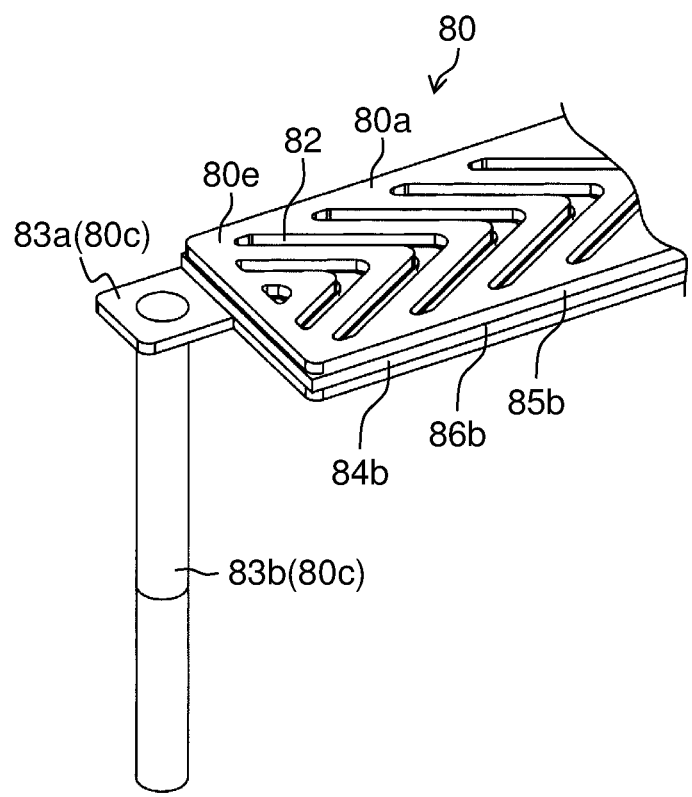
FIG. 17 is an enlarged perspective view illustrating a portion of the electrolytic part of the electrolytic liquid generation device according to the exemplary embodiment of the present disclosure.

With reference to FIGS. 16 and 17, electrolytic part 80 is substantially rectangular when viewed along lamination direction Z, with its lengthwise direction aligned with liquid flowing direction X. Electrolytic part 80 includes laminate 81 in which anode 84, conductive film 86 and, cathode 85 are stacked in this order. Thus, in this exemplary embodiment, laminate 81 has a laminated structure in which conductive film 86 is interposed between mutually adjacent electrodes (anode 84 and cathode 85). In this exemplary embodiment, feeder body 83 made from titanium is disposed beneath anode 84, for example. Electric power is supplied to anode 84 via power feeding body 83.

In this exemplary embodiment, slots 82 are formed in laminate 81. Slots 82 each have opening 82a that is open to flow path 11. Slots 82 are formed such that at least a part of interface 88 between conductive film 86 and cathode 85 is exposed to water (a liquid). Slots 82 are formed such that at least a part of interface 87 between conductive film 86 and anode 84 can also be brought into contact with water (a liquid).

Specifically, cathode holes 85c are formed in cathode 85, whereas conductive-film holes 86c are formed in conductive film 86. When cathode 85 and conductive film 86 are stacked together, cathode holes 85c communicate with conductive-film holes 86c.

Thus, inside surface 86d of conductive film 86 and inside surface 85d of cathode 85 constitute lateral surface 82c of slot 82, while top face (surface) 84a of anode 84 is equivalent to bottom surface 82b of slot 82 (refer to FIG. 20). Because of slot 82 formed in this way, at least a part of interface 88 between conductive film 86 and cathode 85 (an interface between the conductive film and the electrode) is exposed to slot 82, and hence water is freely brought into contact with interface 88 that is exposed to slot 82. Similarly, at least a part of interface 87 between conductive film 86 and anode 84 (an interface between the conductive film and the electrode) is exposed to slot 82, and hence water is freely brought into contact with interface 87 that is exposed to slot 82.

In this exemplary embodiment, slot 82 is formed such that both ends of the slot extending long and thin in widthwise direction Y are bent toward upstream. In other words, cathode holes 85c passing through cathode 85 along lamination direction Z are formed such that the cathode holes are each shaped like a letter V with a bend disposed at a downstream side.

Similarly, conductive-film holes 86c passing through conductive film 86 along lamination direction Z are formed such that the conductive-film holes are each shaped like a letter V with a bend disposed at a downstream side. Cathode holes 85c communicate with conductive-film holes 86c such that V-shaped slots 82 are formed.

Slot 82 may have any of various shapes other than the shape of the letter V described above. For example, the slot may be shaped like a rectangle extending long and thin along widthwise direction Y.

In this exemplary embodiment, a plurality of slots 82 is formed side by side along lengthwise direction X, for example. However, at least one slot 82 may be formed.

In this exemplary embodiment, interface 88 between conductive film 86 and cathode 85 represents a demarcation line between the inside surface of cathode 85 and the inside surface of conductive film 86. Interface 87 between conductive film 86 and anode 84 represents a line of intersection of the surface of anode 84 and the inside surface of conductive film 86.

Conductive film 86 and cathode 85 may be identical to or dissimilar from each other in size. However, at a minimum, the holes (cathode holes 85c and conductive-film holes 86c) need to communicate with each other, and the conductive film and the cathode need to have a satisfactory area of electrical contact with each other. Thus, in consideration of these requirements, it is preferred that conductive film 86 and cathode 85 are substantially identical to each other in projected image (substantially identical in size as viewed along lamination direction Z).

Anode 84 may be identical to or dissimilar from conductive film 86 and cathode 85 in size. However, it is preferred that the size of the anode at least reaches an extent such that the anode can be seen through all slots 82 along lamination direction Z.

In this exemplary embodiment, anode 84, cathode 85, and conductive film 86 are substantially identical to one another in projected image.

Accordingly, if laminate 81 is formed, lateral surfaces of anode 84, cathode 85, and conductive film 86 are substantially flush with one another.

In other words, if laminate 81 is formed, at least lateral surfaces 84b, 85b, 86b extending lengthwise of anode 84, cathode 85, and conductive film 86 are substantially flush with one another.

In this exemplary embodiment, both power feeding body 83 and elastic body 90 are substantially identical to anode 84, cathode 85, and conductive film 86 in projected image.

Electrolytic part 80 electrolyzes water to generate ozone electrochemically at interface 87 between anode 84 and conductive film 86 by receiving ions from conductive film 86 and a current from power source 100.

This electrochemical reaction is as shown below.

Anode side: $3H_2O \rightarrow O_3 + 6H^+ + 6e^-$ $2H_2O \rightarrow O_2 + 4H^+ + 4e^-$ Cathode side: $2H^+ + 2e^- \rightarrow H_2$ Power feeding body 83 is made from titanium, for example, and is in contact with a surface of anode 84 remote from conductive film 86. Shaft attachment 83a is formed at one end of power feeding body 83. Anode power-feeding shaft 83b is fastened to shaft attachment 83a by welding or another technique.

Anode power-feeding shaft 83b is fastened to shaft attachment 83a in this way, so that power feeder 80c for the anode is formed.

Lead wire 102a for positive pole 102 is connected to anode power-feeding shaft 83b, and power feeding body 83 is electrically connected with power source 100 via lead wire 102a.

In this exemplary embodiment, anode power-feeding shaft 83b is fastened to shaft attachment 83a so as to extend along lamination direction Z. Power feeding body 83 is inserted in second recess (electrolytic part containable space) 342, with anode power-feeding shaft 83b extending to a side opposite to flow path 11 (downward). In bottom wall 31 of electrode case 20, a pair of power-feeder insertion holes 313a for insertion of shafts of feeder 80c are formed so as to communicate with respective power-feeder containable spaces 342b. Anode power-feeding shaft 83b is inserted into one of power-feeder insertion holes 313a. Lead wire 102a is connected to a portion of anode power-feeding shaft 83b exposed to an outside of electrode case 20.

Anode 84 is formed by depositing a conductive diamond film on a conductive substrate that is made from silicon and measures roughly 10 mm in width and 50 mm in length, for example. The conductive diamond film possesses conductivity of boron doped diamond. The conductive diamond film with a thickness of around 3 μm is formed on the conductive substrate by a plasma-enhanced chemical vapor deposition (CVD) technique.

In this exemplary embodiment, anode 84 and cathode 85 are each formed into a plate. However anode 84 and cathode 85 may be filmy, reticulate, or linear in shape.

Conductive film 86 is disposed on anode 84 having the formed conductive diamond film. Conductive film 86 is an ion-exchange film having proton conductivity and a thickness that ranges from around 100 μm to 200 μm. With reference to FIGS. 12 and 13, a plurality of conductive-film holes 86c passing through conductive film 86 along a thickness direction (direction Z) is formed.

In this exemplary embodiment, all conductive-film holes 86c are identical in shape. The plurality of conductive-film holes 86c are arranged so as to form a line along lengthwise direction X. Conductive-film holes 86c may be formed into any other shapes and disposed in any other forms.

Cathode 85 is disposed on conductive film 86. Cathode 85 is formed of a stainless steel electrode plate with a thickness of around 0.5 mm, for example. With reference to FIGS. 12 and 13, a plurality of cathode holes 85c passing through cathode 85 along a thickness direction of the plate is formed.

Cathode holes 85c are identical or similar to conductive-film holes 86c in opening shape. Cathode holes 85c are arranged at a pitch and in a direction that are identical to the pitch and the direction for the arrangement of conductive-film holes 86c.

Shaft attachment 85e is formed at one end of cathode 85. Cathode power-feeding shaft 85f is fastened to shaft attachment 85e by welding or another technique. Cathode power-feeding shaft 85f is fastened to shaft attachment 85e in this way, so that power feeder 80c for the cathode is formed.

Lead wire 101a for negative pole 101 is connected to cathode power-feeding shaft 85f, and cathode 85 is electrically connected with power source 100 via lead wire 101a.

In this exemplary embodiment, cathode power-feeding shaft 85f is also fastened to shaft attachment 85e so as to extend along lamination direction Z. Cathode 85 is inserted in second recess (electrolytic part containable space) 342, with cathode power-feeding shaft 85f extending to a side opposite to flow path 11 (downward). At the same time, cathode power-feeding shaft 85f is inserted into the other of power-feeder insertion holes 313a. Lead wire 101a is connected to a portion of cathode power-feeding shaft 85f exposed to the outside of electrode case 20.

As described above, in this exemplary embodiment, the pair of power-feeder containable spaces 342b are formed at the diagonally opposite locations of main-body containable recess 342a.

Thus, in this exemplary embodiment, anode and cathode power-feeding shafts 83b and 85f are disposed on diagonally opposite sections 80e of electrolytic part 80.

In this exemplary embodiment, anode power-feeding shaft 83b, one of anode and cathode power-feeding shafts 83b and 85f, is disposed on the section of electrolytic part 80 adjacent to inlet 11a. Cathode power-feeding shaft 85f, the other of the anode and cathode power-feeding shafts, is disposed on the section of electrolytic part 80 adjacent to outlet 11b.

Electrolytic part 80 is disposed in recess 34 such that a direction in which the plurality of slots 82 are formed side by side is substantially aligned with front-rear direction X.

Figure 4:
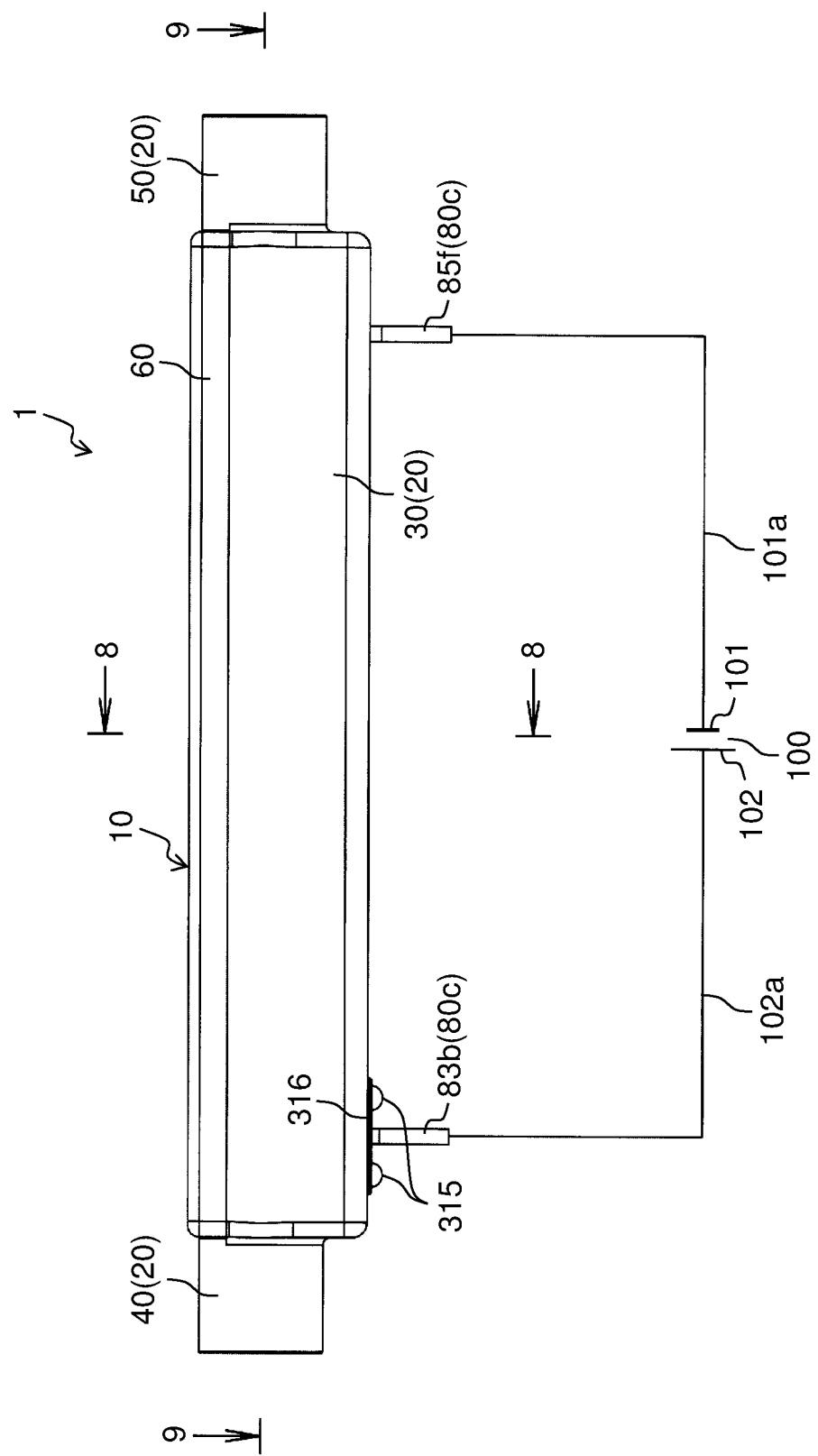
FIG. 4 is a side view illustrating the electrolytic liquid generation device according to the exemplary embodiment of the present disclosure.
Figure 5:
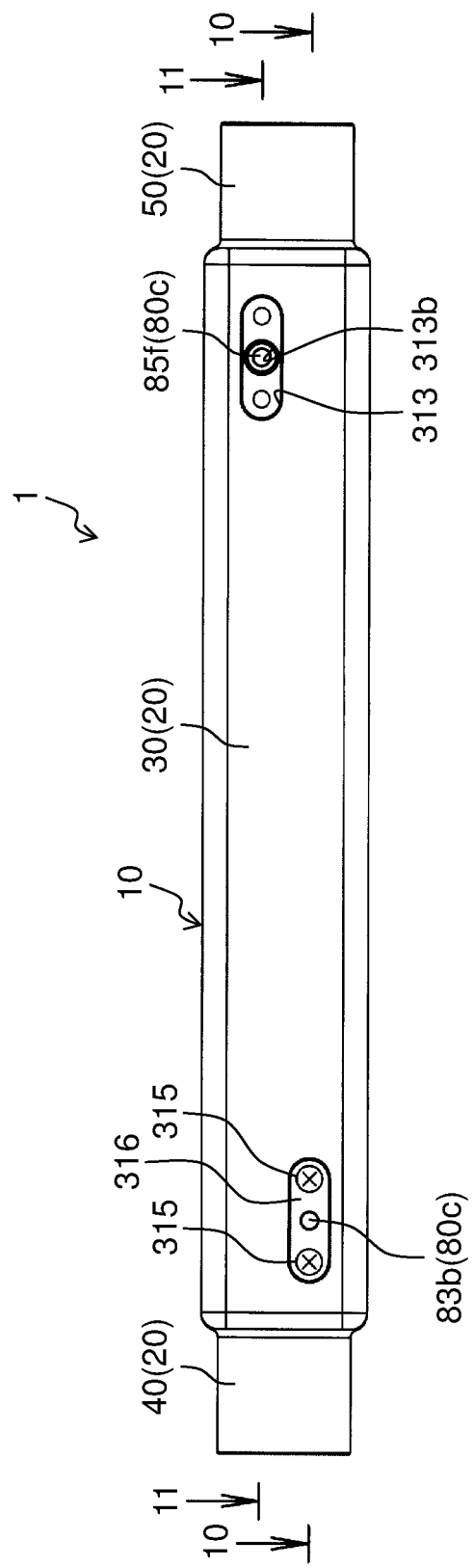
FIG. 5 is a bottom plan view illustrating the electrolytic liquid generation device according to the exemplary embodiment of the present disclosure.

Power source 100 is used to apply a potential difference between anode 84 and cathode 85 between which conductive film 86 is interposed. Anode 84 is electrically connected to positive pole 102 of power source 100 via lead wire 102a, whereas cathode 85 is electrically connected to negative pole 101 of power source 100 via lead wire 101a (refer to FIG. 4). Power source 100 can be electrically connected to a controller (not shown) through wiring (not shown). Power source 100 connected to the controller can switch between power-on and power-off and change output power.

In this exemplary embodiment, slots 82 are formed such that depth D1 of slot 82 is less than at least one of opening length L1 of slot 82 in liquid flowing direction X and height H1 of flow path 11 in lamination direction Z (refer to FIGS. 8 and 20).

In other words, slots 82 are formed such that height H1 of flow path 11 in lamination direction Z>depth D1 of slot 82, or opening length L1 of slot 82 in liquid flowing direction X>depth D1 of slot 82.

In this exemplary embodiment, height H1 of flow path 11 in lamination direction Z is set at about 2 mm as described above.

Depth D1 of slot 82 is the sum of a thickness of conductive film 86 and a thickness of cathode 85 and hence ranges from about 0.6 mm to about 0.7 mm in this exemplary embodiment.

Opening length L1 of slot 82 in liquid flowing direction X is about 1.5 mm.

Accordingly, in this exemplary embodiment, slots 82 are formed such that height H1 of flow path 11 in lamination direction Z>depth D1 of slot 82, and opening length L1 of slot 82 in liquid flowing direction X>depth D1 of slot 82.

In this exemplary embodiment, projections 64 are configured to come into contact with nothing but upper surface (one of surfaces in lamination direction Z) 80a of electrolytic part 80. In other words, at least contact portion 64a of each projection 64 in contact with electrolytic part 80 overlaps no slot 82 in lamination direction Z.

Figure 21:
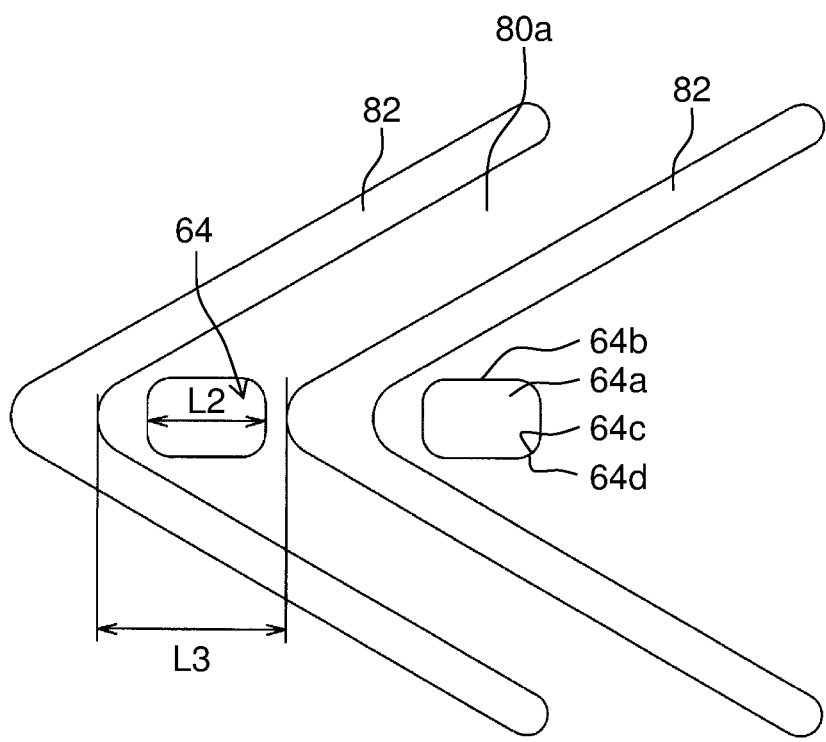
FIG. 21 is a schematic perspective view illustrating a relationship between slots and projections in the electrolytic liquid generation device according to the exemplary embodiment of the present disclosure.

Specifically, with reference to FIG. 21, at least contact portion 64a of projection 64 in contact with electrolytic part 80 has liquid-flowing-direction length L2 less than liquid-flowing-direction length L3 between mutually adjacent slots 82 in electrolytic part 80 such that projections 64 come into contact only with upper surface (one of surfaces in lamination direction Z) 80a of electrolytic part 80.

In this exemplary embodiment, liquid-flowing-direction length L2 of contact portion 64a of projection 64 in contact with electrolytic part 80 is about 1.5 mm.

Liquid-flowing-direction length L3 between mutually adjacent slots 82 in electrolytic part 80 is about 2.0 mm.

In this exemplary embodiment, projections 64 are formed such that liquid-flowing-direction lengths of projection 64 at all sections from the tip (a lower end) to the base (an upper end) is less than liquid-flowing-direction length L3 between adjacent slots 82.

In this exemplary embodiment, upper surface (one of surfaces in lamination direction Z) 80a of electrolytic part 80 exists so as to surround all peripheries of contact portions 64a of projections 64 in contact with electrolytic part 80. This configuration ensures that all surfaces of contact portions 64a of projections 64 in contact with electrolytic part 80 are brought into contact with upper surface (one of surfaces in lamination direction Z) 80a of electrolytic part 80 even if projection 64 is misaligned in any direction on an xy-plane.

In this exemplary embodiment, projections 64 are formed such that contour 64b viewed along lamination direction Z is a quadrilateral (a polygon) with rounded edges 64d formed at apexes 64c.

Ozone water generator (electrolytic liquid generation device) 1 having this configuration is built by a method described below, for example.

First, elastic body 90 is inserted into recess 34 via opening 332a of electrode case 20, so that elastic body 90 is disposed in second recess (electrolytic part containable space) 342.

Then, power feeding body 83 is inserted into recess 34 via opening 332a of electrode case 20 with a tip of anode power-feeding shaft 83b facing downward. Concurrently, anode power-feeding shaft 83b is inserted into one of power-feeder insertion holes 313a, so that a main part of power feeding body 83 is stacked on elastic body 90.

Then, anode 84 is inserted into recess 34 via opening 332a of electrode case 20, so that anode 84 is stacked on power feeding body 83.

Then, conductive film 86 is inserted into recess 34 via opening 332a of electrode case 20, so that conductive film 86 is stacked on anode 84.

Then, cathode 85 is inserted into recess 34 via opening 332a of electrode case 20 with a tip of cathode power-feeding shaft 85f facing downward. Concurrently, cathode power-feeding shaft 85f is inserted into the other of power-feeder insertion holes 313a, so that a main part of cathode 85 is stacked on conductive film 86.

At the same time, elastic body 90 and the components of electrolytic part 80 are guided by projecting guides (introduction guides) 353 and inserted in second recess (electrolytic part containable space) 342.

However, elastic body 90 is under virtually no strain (practically no elastic deformation) after elastic body 90 and the components of electrolytic part 80 are merely and simply stacked in recess 34.

Figure 18:
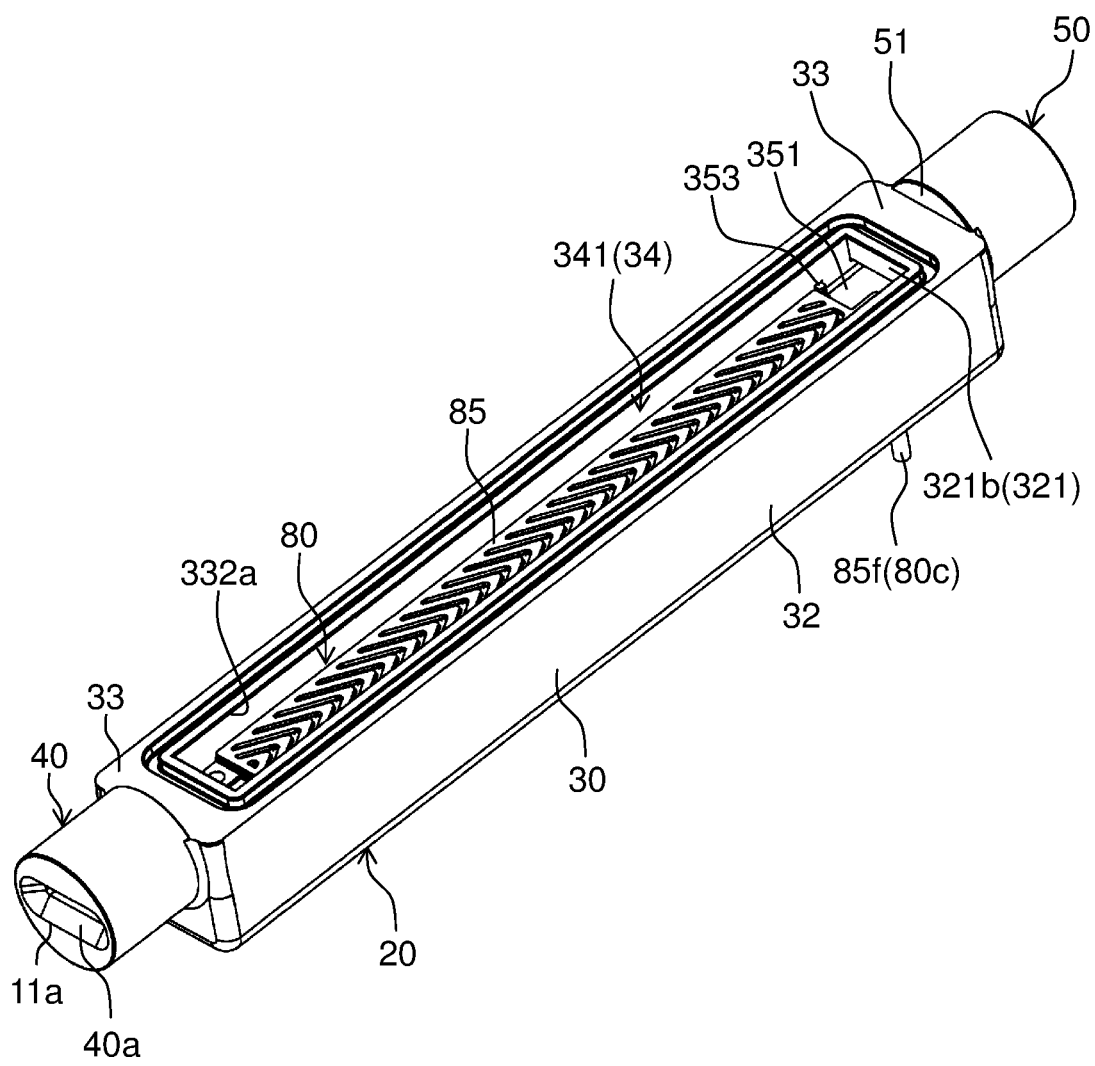
FIG. 18 is a perspective view illustrating the electrolytic part stacked in the electrode case of the electrolytic liquid generation device according to the exemplary embodiment of the present disclosure.

As a result, at least cathode 85 of electrolytic part 80 juts above intermediate surfaces 351 (refer to FIG. 18). Nevertheless, projecting guides (introduction guides) 353 prevent cathode 85 jutting above intermediate surfaces 351 from moving along lengthwise direction X. In this exemplary embodiment, widthwise-direction inner surface 321a puts elastic body 90 and the components of electrolytic part 80 in proper alignment in widthwise direction Y.

Subsequently, electrode case lid 60 is shifted to electrode case 20 in lamination direction Z, with fitting projection 62 fitting in opening 332*a*, so that welding projection 63 is inserted in groove 333*a*.

Electrode case lid 60 and electrode case 20 are welded together by vibration welding, heat welding, or other welding, with fitting projection 62 fitting in opening 332*a* and welding projection 63 being inserted in groove 333*a*.

Accordingly, recess 34 in electrode case 20 is sealed with electrode case lid 60.

Figure 19:
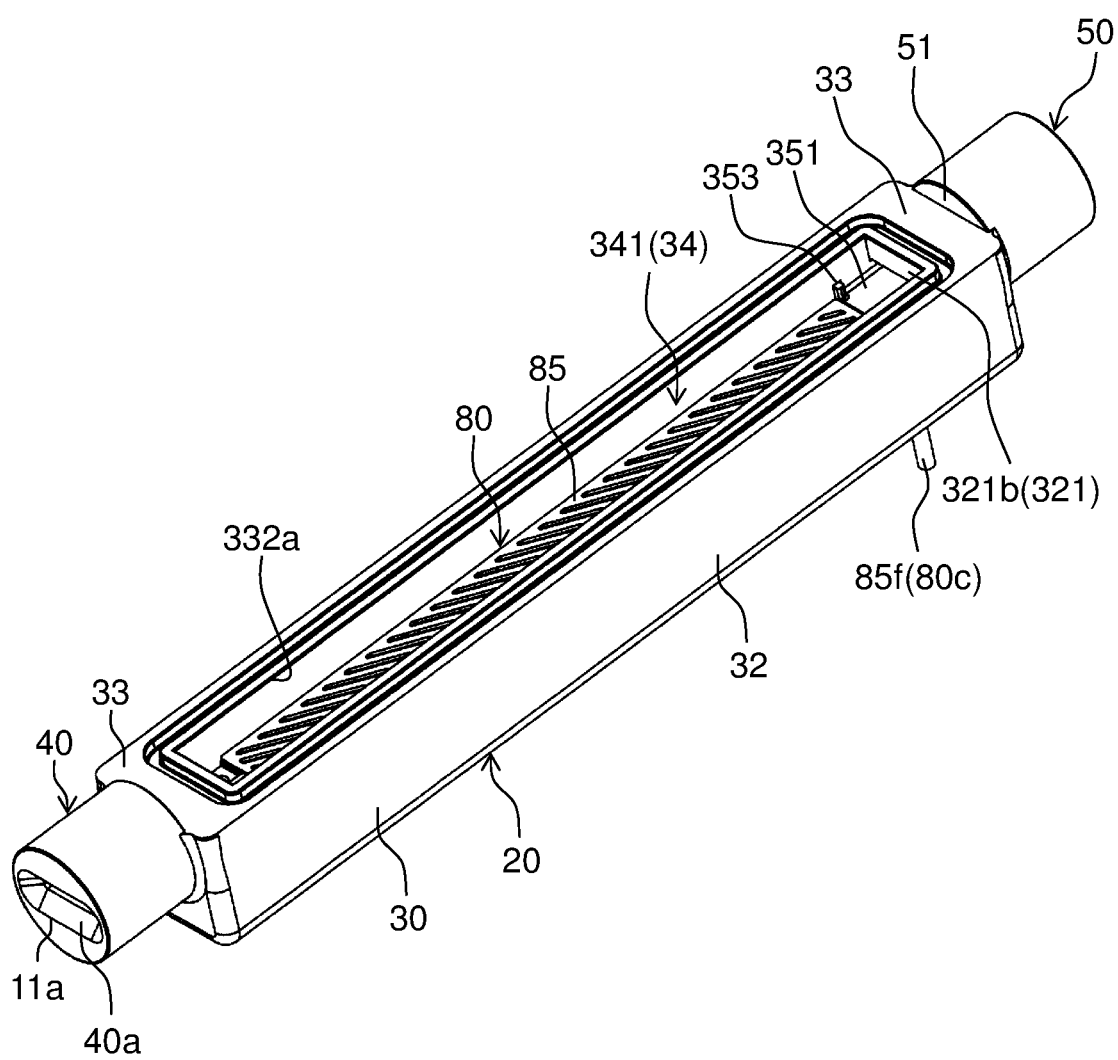
FIG. 19 is a perspective view illustrating the electrolytic part contained in a second recess in the electrode case of the electrolytic liquid generation device according to the exemplary embodiment of the present disclosure.

At the same time, upper surface (one of surfaces in lamination direction Z) 80*a* of electrolytic part 80 is pressed downward by extending walls 62*b* and projections 64, and hence elastic body 90 is elastically deformed and entire electrolytic part 80 is inserted in second recess (electrolytic part containable space) 342 (refer to FIG. 19).

Then, O-rings 314 are put on the shafts (anode power-feeding shaft 83*b* and cathode power-feeding shaft 85*f* of power feeder 80*c* through the tips of the shafts exposed to the outside of electrode case 20, and the O-rings are disposed in O-ring insertion grooves 313*b* formed in retainer plate containable recesses 313.

The tips of the shafts (anode power-feeding shaft 83*b* and cathode power-feeding shaft 85*f* of power feeder 80*c* are inserted into shaft insertion holes 316*a* formed in retainer plates 316, and retainer plates 316 are contained in retainer plate containable recesses 313.

Screws 315 are inserted through screw insertion holes 316*b* formed in retainer plates 316 and into screw holes 313*c* formed in retainer plate containable recesses 313 such that retainer plates 316 are fastened to electrode case 20 with the screws.

Accordingly ozone water generator (electrolytic liquid generation device) 1 is built.

In this way, ozone water generator (electrolytic liquid generation device) 1 according to the present exemplary embodiment is designed to be built only by shifting components to electrode case 20 in lamination direction Z.

In the exemplary embodiment described above, anode and cathode power-feeding shafts 83*b* and 85*f* are welded to respective shaft attachments 83*a*, 85*e*, for example. However, these components may be configured as shown in FIG. 22.

Figure 22:
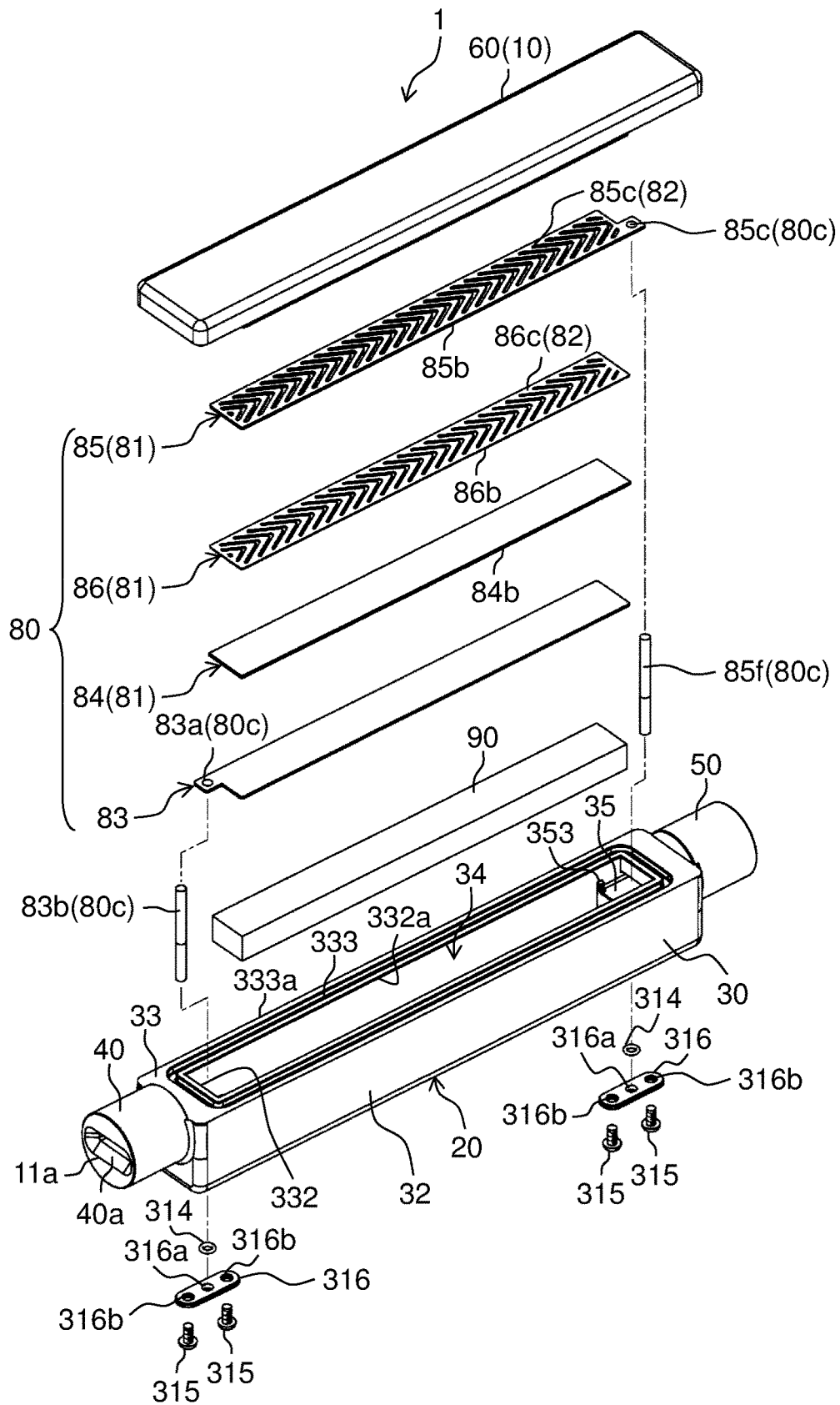
FIG. 22 is an exploded perspective view illustrating a first modification of the electrolytic liquid generation device according to the exemplary embodiment of the present disclosure.

In FIG. 22, anode power-feeding shaft 83*b* is provided separately from power feeding body 83 (anode 84), and cathode power-feeding shaft 85*f* is provided separately from cathode 85.

When ozone water generator (electrolytic liquid generation device) 1 is built, the shafts come into contact with power feeding body 83 and cathode 85.

In FIG. 22, both anode and cathode power-feeding shafts 83*b* and 85*f* are provided separately from the respective components, for example. However, only one of anode and cathode power-feeding shafts 83*b* and 85*f* may be provided separately from the corresponding component.

Figure 23:
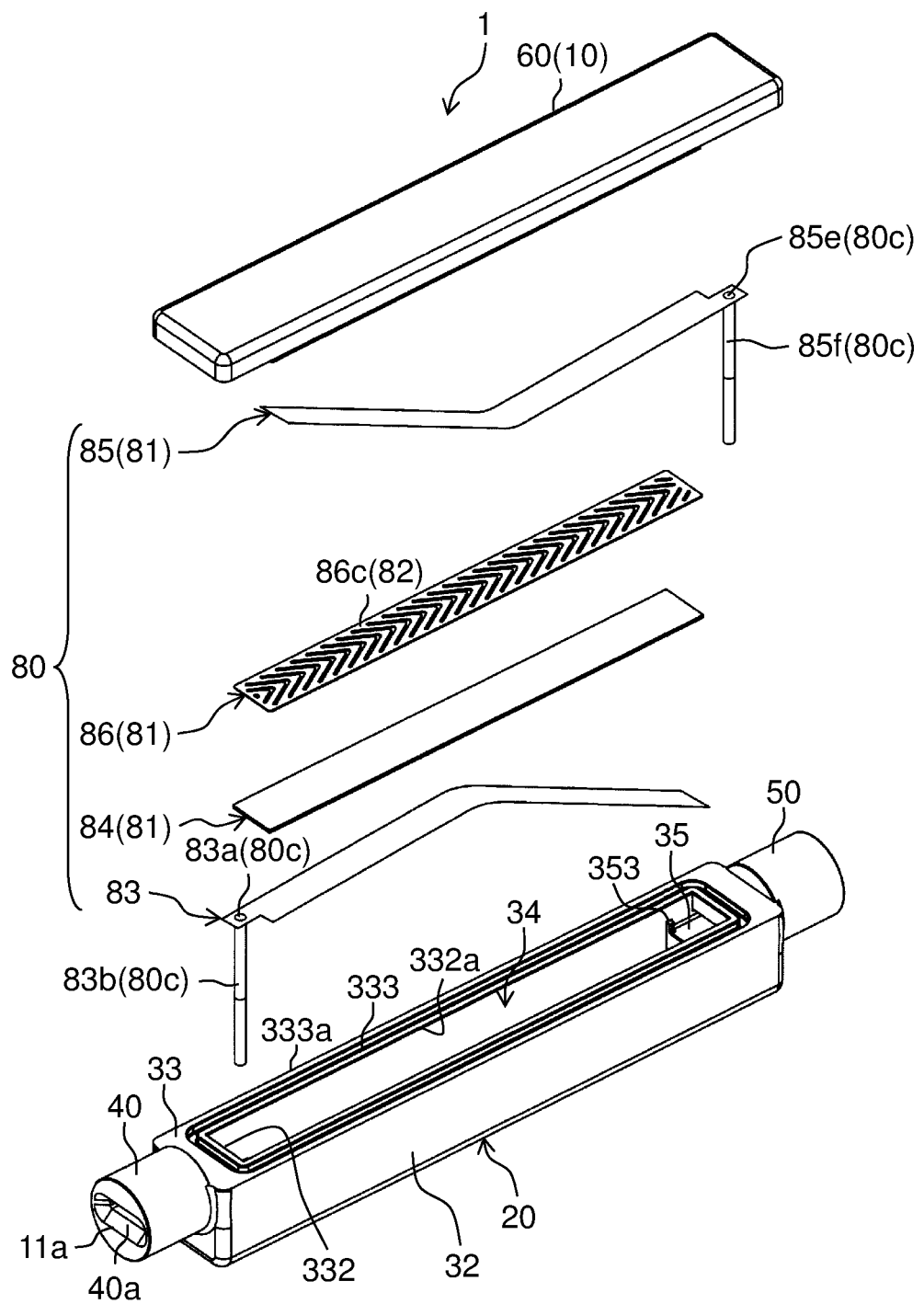
FIG. 23 is an exploded perspective view illustrating a second modification of the electrolytic liquid generation device according to the exemplary embodiment of the present disclosure.

With reference to FIG. 23, at least one of the components of electrolytic part 80 may be bent in lamination direction Z.

In FIG. 23, power feeding body 83 and cathode 85, i.e. components of electrolytic part 80 disposed at both ends in lamination direction Z, are bent in lamination direction Z, for example. In FIG. 23, cathode 85 includes cathode holes formed to communicate with conductive-film holes 86*c* although illustration is omitted.

When ozone water generator (electrolytic liquid generation device) 1 including the components bent in this way is built, the bent components are transformed into substantially flat plates.

This configuration generates pressure on conductive film 86 when ozone water generator (electrolytic liquid generation device) 1 is built.

In other words, power feeding body 83 and cathode 85 that are bent in lamination direction Z in FIG. 23 act as elastic body 90 illustrated in the above-described exemplary embodiment.

Accordingly, on condition that power feeding body 83 and cathode 85 are bent in lamination direction Z and configured to generate pressure on conductive film 86, even ozone water generator (electrolytic liquid generation device) 1 that is built without elastic body 90 as shown in FIG. 23 provides improved adhesion between components of electrolytic part 80.

FIG. 23 illustrates ozone water generator (electrolytic liquid generation device) 1 configured to be built without elastic body 90, for example. However, the ozone water generator may include power feeding body 83 and cathode 85 that are bent in lamination direction Z, as well as elastic body 90 disposed below power feeding body 83.

The components of electrolytic part 80 may be bent into any forms, with proviso that the components generate pressure on conductive film 86 when ozone water generator (electrolytic liquid generation device) 1 is built. In FIG. 23, the components are bent in a direction (lamination direction Z) perpendicular to lengthwise direction (liquid flowing direction) X such that the components each have a protrusion facing conductive film 86. For example, the components may be each bent so as to have a protrusion facing away from conductive film 86. The components may be corrugated or each have bends at a plurality of locations.

Only one of power feeding body 83 and cathode 85 may be bent. Any other component of electrolytic part 80 may be bent. In other words, any of the components of electrolytic part 80 may be bent, with proviso that the bent component generates pressure on conductive film 86 when ozone water generator (electrolytic liquid generation device) 1 is built.

Operation and working of ozone water generator (electrolytic liquid generation device) 1 having this configuration will now be described.

First, water (a liquid) is fed from inlet 11*a* into flow path 11 to supply ozone water generator (electrolytic liquid generation device) 1 with water (a liquid).

A part of the water fed to flow path 11 is flowed into slots 82 and brought into contact with interfaces 87, 88 for slots 82.

In this state (electrolytic part 80 immersed in the supplied water), power source 100 is turned on. A voltage is placed between anode 84 and cathode 85 of electrolytic part 80 by power source 100 and thus a potential difference is generated between anode 84 and cathode 85 between which conductive film 86 is interposed. Accordingly, the potential difference generated between anode 84 and cathode 85 energizes anode 84, conductive film 86, and cathode 85. The electrolytic part electrolyzes water in the slots 82, so that ozone (an electrolytic product) is generated near interfaces 87, 88 between conductive film 86 and anode 84.

The placed voltage ranges from several volts to several tens of volts. A quantity of generated ozone (an electrolytic product) increases with a rise in the voltage (current value).

Ozone (an electrolytic product) generated near interfaces 87, 88 between conductive film 86 and anode 84 is dissolved in the water (a liquid) while being carried to the downstream side of flow path 11 along the flow of the water (a liquid). Since ozone (an electrolytic product) is dissolved in the water (a liquid) in this way, water containing dissolved ozone (ozone water: an electrolytic liquid) is produced.

Ozone water generator (electrolytic liquid generation device) 1 having this configuration can be applied to instruments such as an electric device using an electrolytic liquid produced by the electrolytic liquid generation device and a liquid refining machine equipped with the electrolytic liquid generation device.

Examples of the electric device and the liquid refining machine include water treatment devices like water purifiers, as well as washing machines, dish washers, warm-water wash toilet seats, refrigerators, hot and cold water supply systems, sterilizers, medical equipment, air conditioners, and kitchen appliances.

As described above, ozone water generator (electrolytic liquid generation device) 1 according to the present exemplary embodiment includes electrolytic part 80 and housing 10 in which electrolytic part 80 is disposed. Electrolytic part 80 has laminate 81 including mutually adjacent electrodes 84, 85 and conductive film 86 interposed between the electrodes. Electrolytic part 80 electrolyzes water (a liquid).

In housing 10, flow path 11 is formed such that liquid flowing direction X intersects with lamination direction Z of laminate 81.

Flow path 11 has inlet 11a and outlet 11b. The inlet communicates with watercourse 71a in upstream pipe 71 (an external flow path located upstream) to allow a liquid to flow into the inlet and be fed to electrolytic part 80. The outlet communicates with watercourse 72a in downstream pipe 72 (an external flow path located downstream) to allow ozone water (an electrolytic liquid) produced at electrolytic part 80 to flow out from the outlet.

Electrolytic part 80 has slot 82 that is open to flow path 11 and that is formed such that at least a part of interfaces 87, 88 between conductive film 86 and respective electrodes 84, 85 is exposed to the slot.

Housing 10 includes electrode case 20 having recess 34 with opening 332a to enable insertion of electrolytic part 80 through the opening and to contain electrolytic part 80 in recess 34, and electrode case lid 60 to cover opening 332a of electrode case 20.

Electrolytic part 80 is contained in recess 34 such that lamination direction Z of laminate 81 is substantially aligned with a direction in which opening 332a opens.

This configuration ensures that a direction in which electrode case lid 60 is attached to electrode case 20 is substantially aligned with lamination direction Z of laminate 81. As a result, ozone water generator (electrolytic liquid generation device) 1 can be built only by shifting components of electrolytic part 80 and electrode case lid 60 to electrode case 20 in lamination direction Z. Thus, the present exemplary embodiment provides ozone water generator (electrolytic liquid generation device) 1 that can be built with improved facility.

In this exemplary embodiment, flow path 11 is formed between electrolytic part 80 and electrode case lid 60.

This configuration enables the formation of flow path 11 by covering opening 332a of electrode case 20 with electrode case lid 60 while electrolytic part 80 is contained in recess 34. Consequently, ozone water generator (electrolytic liquid generation device) 1 having flow path 11 can be built with improved facility.

In the electrolytic liquid generation device disclosed in above-described PTL 1, the electrolytic electrode unit is formed by simply stacking an anode, a conductive film, and a cathode. As a result, when the anode, the conductive film, and the cathode are stacked, a positional relationship between the components can be changed in a direction (on the xy-plane) intersecting with lamination direction Z.

If, at the time of stacking the anode, the conductive film, and the cathode, the positional relationship between the components is changed in a direction (on the xy-plane) intersecting with lamination direction Z, an area of contact between the anode, the conductive film, and the cathode increases or decreases. This can cause instability in the concentration of ozone (an electrolytic product) in ozone water (an electrolytic liquid).

If the components get misaligned particularly in flow-path widthwise direction Y, a quantity of interfaces exposed to a slot varies substantially. This can cause increased instability in the concentration of ozone (an electrolytic product) in ozone water (an electrolytic liquid).

Thus, in this exemplary embodiment, electrodes 84, 85, and conductive film 86 are stacked such that at least lateral surfaces 84b, 85b, 86b extending lengthwise are substantially flush with one another.

As a consequence, laminate 81 can be put in proper alignment in flow-path widthwise direction Y only by ensuring that lateral surfaces 84b, 85b, 86b of the components extending lengthwise are substantially flush with one another. This configuration allows laminate 81 to be put in proper alignment in flow-path widthwise direction Y with improved facility.

Misalignment in flow-path widthwise direction Y exerts a great influence on the capacity for generating ozone (an electrolytic product). This configuration prevents such misalignment and thereby increases stability in the concentration of ozone (an electrolytic product) in ozone water (an electrolytic liquid).

Electrode case 20 is provided with introduction guides 353 that extend in lamination direction Z of laminate 81 and guide the insertion of electrolytic part 80 into second recess 34.

Introduction guides 353 provided in this way prevent components of laminate 81 from getting misaligned during a process of building ozone water generator (electrolytic liquid generation device) 1. This configuration enables ozone water generator (electrolytic liquid generation device) 1 to be built with improved facility.

As described above, in the electrolytic liquid generation device disclosed in PTL 1, the electrolytic electrode unit is formed by simply stacking an anode, a conductive film, and a cathode. As a result, a gap may be made between the stacked components. The gap made between the components can create uneven energization on a lamination surface of the laminate. If energization on the lamination surface of the laminate gets uneven in this way, efficiency in generation of ozone (an electrolytic product) can decrease and the life of the electrodes and the conductive film can be shorten.

Thus, in this exemplary embodiment, elastic body 90 is disposed in housing 10 such that the elastic body is in contact with one side of electrolytic part 80 in lamination direction Z of laminate 81.

Elastic body 90 disposed in this way is configured to press the one side of electrolytic part 80 in lamination direction Z and compensate for variation in a size of electrolytic part 80 in lamination direction Z. This configuration allows electrolytic part 80 to be put in proper alignment in lamination direction Z with improved facility.

Elastic body 90 disposed there allows constant pressure to be applied to entire electrolytic part 80 and thus contributes to improved adhesion between components. Accordingly, improved adhesion between the components improves efficiency in generation of ozone (an electrolytic product) and prolongs the life of the electrodes and the conductive film.

With elastic body 90 that provides improved adhesion between the components, electrolytic part 80 including the components with improved adhesion can be built with improved facility while simplification of the configuration is ensured.

In this exemplary embodiment, elastic body 90 is disposed between electrolytic part 80 and electrode case 20.

This configuration allows the disposition of elastic body 90 inside electrode case 20 (inside recess 34) at the time of building ozone water generator (electrolytic liquid generation device) 1 and thus enables ozone water generator (electrolytic liquid generation device) 1 to be built with improved facility.

Welded part 17 where electrode case 20 and electrode case lid 60 are welded together is formed at periphery 333 of opening 332a in housing 10.

This configuration allows the attachment of electrode case lid 60 to electrode case 20 with improved facility and thus enables ozone water generator (electrolytic liquid generation device) 1 to be built with improved facility.

In this exemplary embodiment, the electrodes are made up of anode 84 and cathode 85.

Electrolytic part 80 includes anode power-feeding shaft 83b electrically connected to anode 84 and cathode power-feeding shaft 85f electrically connected to cathode 85. The anode power-feeding shaft is configured for applying a voltage to anode 84, whereas the cathode power-feeding shaft is configured for applying a voltage to cathode 85.

Anode and cathode power-feeding shafts 83b and 85f extend along lamination direction Z.

This configuration allows sizes and positions of components of electrolytic part 80 to be uniquely defined and thus prevents the components from getting misaligned while the components are stacked. This configuration in turn allows electrolytic part 80 to be built and the components to be put in proper alignment with improved facility and enables ozone (an electrolytic product) to be generated with increased stability.

In this exemplary embodiment, anode and cathode power-feeding shafts 83b and 85f extend to a side opposite to flow path 11.

This configuration ensures that anode and cathode power-feeding shafts 83b and 85f are not disposed in flow path 11 and thus prevents water (a liquid) flowing in flow path 11 from building up.

In this exemplary embodiment, anode power-feeding shaft 83b, one of anode and cathode power-feeding shafts 83b and 85f, is disposed on the section of electrolytic part 80 adjacent to inlet 11a. Cathode power-feeding shaft 85f, the other of the anode and cathode power-feeding shafts, is disposed on the section of electrolytic part 80 adjacent to outlet 11b.

This configuration can increase a distance between anode and cathode power-feeding shafts 83b and 85f as large as possible while preventing ozone water generator (electrolytic liquid generation device) 1 from increasing in size. This in turn prevents anode 84 and cathode 85 from being short-circuited while preventing ozone water generator (electrolytic liquid generation device) 1 from increasing in size.

Electrolytic part 80 is substantially rectangular when viewed along lamination direction Z, with its lengthwise direction aligned with liquid flowing direction X. Anode and cathode power-feeding shafts 83b and 85f are disposed at diagonally opposite sections 80e of electrolytic part 80.

This configuration requires no distinction between inlet and outlet sides of electrode case 20 and thus enables ozone water generator (electrolytic liquid generation device) 1 to be built with increased efficiency.

At the same time, at least one of anode and cathode power-feeding shafts 83b and 85f may be provided separately from respective electrodes 84, 85.

This configuration eliminates the need for welding anode power-feeding shaft 83b and/or cathode power-feeding shaft 85f. This in turn facilitates the processing of components of electrolytic part 80 and contributes to cost reduction.

At least one of the components (power feeding body 83 and cathode 85) of electrolytic part 80 may be bent in lamination direction Z.

This configuration generates stable pressure on electrodes 84, 85 when ozone water generator (electrolytic liquid generation device) 1 is built. This in turn ensures an energization area in electrolytic part 80 with increased stability and improves the stability of the capacity for generating ozone (an electrolytic product). This configuration eliminates the need for fastening electrolytic part 80 disposed in electrode case 20 with screws or other fasteners and thus prevents the generation of variation in assembly, resulting in improvement in the stability of the capacity for generating ozone (an electrolytic product). This contributes to a reduction in a number of components and hence cost reduction.

PTL 1 described above discloses an electrolytic liquid generation device that includes a baffle structure to make tap water passing through an electrolytic electrode unit turbulent. The baffle structure provided in this way is configured to electrolyze tap water with increased efficiency.

Unfortunately, in some cases, simply generating turbulent flow does not provide water power sufficient to forcibly remove minute air bubbles of an electrolytic product from an electrode interface, so that the generated electrolytic product grows into large bubbles without being removed from the electrode interface.

An electrolytic product that has grown into large bubbles in this way may drift in a liquid without being dissolved in the liquid even if the bubbles are removed from the electrode interface. This may lead to a reduction in the concentration of the electrolytic product dissolved in the liquid.

Thus, in this exemplary embodiment, slots 82 are formed such that depth D1 of slot 82 is less than at least one of opening length L1 of slot 82 in liquid flowing direction X and height H1 of flow path 11 in lamination direction Z.

Accordingly, if height H1 of flow path 11 in lamination direction Z>depth D1 of slot 82, or if opening length L1 of slot 82 in liquid flowing direction X>depth D1 of slot 82, a rate of flow of water rises in a location (near interface 87) where ozone (an electrolytic product) is generated. This enables the removal of generated ozone (an electrolytic product) in minute air bubbles. This configuration gets rid of a factor that causes ozone (an electrolytic product) to drift in a liquid without being dissolved in the liquid. As a result, the concentration of ozone (an electrolytic product) dissolved in water (a liquid) increases.

This configuration also prevents water (a liquid) flowing in flow path 11 from building up in slots 82. In this respect as well, the concentration of ozone (an electrolytic product) dissolved in water (a liquid) increases.

PTL 1 described above discloses an electrolytic liquid generation device in which an anode, a conductive film, and a cathode are laminated, the conductive film and the cathode have water holes, and the water holes in the layers integrate with each other to form one water passage (a flow path). Because of this configuration, an electrolytic liquid generation device can decrease in size and provide cost reduction.

Unfortunately, PTL 1 provides no specification for a height of the flow path. As a result, the flow rate of a liquid flowing through the flow path can substantially decrease depending on the structure of the flow path. Consequently, the above-described configuration in PTL 1 may cause a reduction in the concentration of an electrolytic product dissolved in a liquid.

Thus, in this exemplary embodiment, flow path 11 is formed such that flow path height H1 along lamination direction Z is less than flow path width W1.

If flow path 11 is formed in this way such that flow path height H1 along lamination direction Z is less than flow path width W1, a surface flow rate near interfaces 87, 88 rises. As a result, generated ozone (an electrolytic product) can be dissolved in water (a liquid) with increased speed, and the concentration of ozone (an electrolytic product) dissolved in water (a liquid) increases.

As described above, the electrolytic electrode unit disclosed in PTL 1 is formed by simply stacking the anode, the conductive film, and the cathode. This may cause uneven contact between the anode and the conductive film and between the conductive film and the cathode.

Uneven contact between the anode and the conductive film and between the conductive film and the cathode in this way may cause instability in the concentration of a dissolved electrolytic product and decrease efficiency in generation of the electrolytic product.

Thus, in this exemplary embodiment, projections 64 are configured to come into contact with surface 80a of electrolytic part 80 adjacent to flow path 11.

Projections 64 brought into contact with surface 80a of electrolytic part 80 adjacent to flow path 11 can press this electrolytic part 80 and thus improve evenness of contact between conductive film 86 and electrodes 84, 85. This improves evenness of density of an electric current flowing through electrolytic part 80 and thereby improves efficiency in generation of ozone (an electrolytic product). This increases stability in the concentration of ozone (an electrolytic product) dissolved in water (a liquid).

In this exemplary embodiment, projections 64 are formed midway between edges of flow path 11 in flow-path widthwise direction Y.

This configuration enables projections 64 to press a middle of electrolytic part 80 and thus improves evenness of contact between conductive film 86 and electrodes 84, 85. This improves evenness of density of the electric current flowing through electrolytic part 80 and thereby improves efficiency in generation of ozone (an electrolytic product). This increases stability in the concentration of ozone (an electrolytic product) dissolved in water (a liquid).

In this exemplary embodiment, a plurality of projections 64 is formed side by side along liquid flowing direction X.

This configuration enables projections 64 to press electrolytic part 80 along liquid flowing direction X and thus improves evenness of contact between conductive film 86 and electrodes 84, 85. This improves evenness of density of the electric current flowing through electrolytic part 80 and thereby improves efficiency in generation of ozone (an electrolytic product). This increases stability in the concentration of ozone (an electrolytic product) dissolved in water (a liquid).

In this exemplary embodiment, projections 64 are formed such that at least contact portion 64a of each projection 64 in contact with electrolytic part 80 overlaps no slot 82 in lamination direction Z.

This configuration ensures that no projection 64 is disposed over slot 82 and thereby prevents projections 64 from interfering with the flow of water (a liquid) in slots 82. This prevents the formation of a buildup of air bubbles near interfaces 87, 88 for slot 82 and contributes to increased concentration of ozone (an electrolytic product) dissolved in water (a liquid).

In this exemplary embodiment, a plurality of slots 82 is formed side by side along liquid flowing direction X. At least contact portion 64a of each projection 64 in contact with electrolytic part 80 has length L2 less than length L3 between slots 82 adjacent to each other in electrolytic part 80 in the liquid flowing direction.

This configuration ensures that no projections 64 are disposed over slots 82 even if projections 64 are misaligned to some extent at the time of building ozone water generator (electrolytic liquid generation device) 1. This prevents the formation of a buildup of air bubbles near interfaces 87, 88 for slot 82 with improved reliability and contributes to increased concentration of ozone (an electrolytic product) dissolved in water (a liquid).

In this exemplary embodiment, projections 64 are formed such that contour 64b viewed along lamination direction Z is a polygon with rounded edges 64d formed at apexes 64c.

Rounded edges 64d formed at apexes 64c of contour 64b of each projection 64 in this way can smooth the flow of a liquid near projection 64 and thus prevent the formation of a buildup of air bubbles with improved reliability. This configuration contributes to increased concentration of ozone (an electrolytic product) dissolved in water (a liquid).

The scope of the present disclosure should not be limited to the exemplary embodiment described above, and should include various modifications and alterations.

The exemplary embodiment described above illustrates an ozone water generator that generates ozone and dissolves the ozone in water to produce ozone water, for example. The material generated by an electrolytic liquid generation device may be hypochlorous acid, for example, other than the ozone and may be used for purposes such as disinfection and water treatment. An electrolytic liquid generation device may be configured to produce an electrolyte solution such as oxygen water, hydrogen water, water containing dissolved chlorine, or a hydrogen peroxide solution.

Anode 84 may be made from any other material such as conductive silicon, conductive diamond, titanium, platinum, lead oxide, or tantalum oxide, with proviso that the anode is an electrode having conductivity and durability enough to produce electrolyzed water. If anode 84 is a diamond electrode, the electrode may be produced by any method other than film deposition techniques. A substrate for the anode may be made of any material other than metals.

Cathode 85 may be made from any other material such as platinum, titanium, stainless steel, or conductive silicon, with proviso that the cathode is an electrode having conductivity and durability.

The housing, the electrolytic part, and other detailed specifications (e.g., shape, size, and layout) may be suitably changed.

INDUSTRIAL APPLICABILITY

An electrolytic liquid generation device according to the present disclosure, as described above, can increase concentration of an electrolytic product in an electrolyzed liquid. Thus, this technology can find application to water treatment devices like water purifiers, as well as washing machines, dish washers, warm-water wash toilet seats, refrigerators, hot and cold water supply systems, sterilizers, medical equipment, air conditioners, and kitchen appliances, for example.

REFERENCE MARKS IN THE DRAWINGS 1 ozone water generator (electrolytic liquid generation device)
10 housing (electrode case 20 and electrode case lid 60)
11 flow path
11a inlet
11b outlet
17 welded part
20 electrode case
34 recess
60 electrode case lid
71a watercourse (external flow path)
72a watercourse located downstream (external flow path)
80 electrolytic part
80a surface
80e diagonally opposite sections
81 laminate
82 slot
82a opening
83b anode power-feeding shaft
84 anode (electrode)
85 cathode (electrode)
85f cathode power-feeding shaft
86 conductive film
87 interface between anode 84 and conductive film 86
88 interface between cathode 85 and conductive film 86
90 elastic body
332a opening
333 periphery
353 introduction guide
D1 slot depth
H1 flow path height in lamination direction
L1 slot opening length in liquid flowing direction
L2 length of contact portion of projection in liquid flowing direction
L3 length between slots in electrolytic part in liquid flowing direction
W1 flow path width
X liquid flowing direction (lengthwise direction: front-rear direction)
Y widthwise direction (flow-path widthwise direction)
Z lamination direction (up-down direction)

The invention claimed is:

1. An electrolytic liquid generation device comprising:
an electrolytic part comprising a laminate, the laminate including electrodes and an ion exchange film interposed between the electrodes; and
a housing in which the electrolytic part is disposed, wherein:
in the housing, a flow path is formed in such a manner that a liquid flowing direction intersects with a lamination direction of the laminate,
the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet,
the electrolytic part has a slot that is open to the flow path and that is formed in such a manner that at least a part of interfaces between the ion exchange film and the respective electrodes is exposed to the slot,
the housing includes an electrode case, the electrode case comprising an electrode case lid and a recess, the recess having an opening configured to enable insertion of the electrolytic part through the opening, the electrode case lid covering the opening,
the electrolytic part is disposed in the recess of the electrode case in such a manner that the lamination direction of the laminate is substantially aligned with a direction in which the opening opens,
the flow path is formed between the electrolytic part having the slot and the electrode case lid and the liquid flows only along the flow path over the electrolytic part, and
the electrolytic liquid generation device further includes an elastic body disposed in the housing in such a manner that at least a part of the elastic body is in continuous contact with one side of the electrolytic part from one end to another end of the elastic body in liquid flowing direction.

2. The electrolytic liquid generation device according to claim 1, wherein the electrodes and the ion exchange film are stacked in such a manner that at least lateral surfaces of the electrodes and the ion exchange film extending lengthwise are substantially flush with one another.

3. The electrolytic liquid generation device according to claim 1, wherein
the electrode case is provided with an introduction guide that extends in the lamination direction of the laminate and guides insertion of the electrolytic part into the recess.

4. The electrolytic liquid generation device according to claim 1, wherein the elastic body is a cuboid.

5. The electrolytic liquid generation device according to claim 1, wherein the elastic body is disposed between the electrolytic part and the electrode case.

6. The electrolytic liquid generation device according to claim 1, wherein a welded part where the electrode case and the electrode case lid are welded together is formed at a periphery of the opening of the electrode case in the housing.

7. The electrolytic liquid generation device according to claim 1, wherein
the electrodes are made up of an anode and a cathode,
the electrolytic part further includes an anode power-feeding shaft electrically connected to the anode to apply a voltage to the anode and a cathode power-feeding shaft electrically connected to the cathode to apply a voltage to the cathode, and
the anode power-feeding shaft and the cathode power-feeding shaft extend along the lamination direction.

8. An electrolytic liquid generation device comprising:
an electrolytic part comprising a laminate, the laminate including electrodes and an ion exchange film interposed between the electrodes; and
a housing in which the electrolytic part is disposed, wherein:
in the housing, a flow path is formed in such a manner that a liquid flowing direction intersects with a lamination direction of the laminate,
the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, the flow path is formed between the electrolytic part having the slot and the electrode case lid and the liquid flows only along the flow path over the electrolytic part, the electrodes are made up of an anode and a cathode, the electrolytic part further includes an anode power-feeding shaft electrically connected to the anode to apply a voltage to the anode and a cathode power-feeding shaft electrically connected to the cathode to apply a voltage to the cathode, the anode power-feeding shaft and the cathode power-feeding shaft extend along the lamination direction, and the anode power-feeding shaft and the cathode power-feeding shaft extend toward a bottom of the opening of the electrode case.

9. An electrolytic liquid generation device comprising:

an electrolytic part comprising a laminate, the laminate including electrodes and an ion exchange film interposed between the electrodes; and a housing in which the electrolytic part is disposed, wherein:

in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, the flow path is formed between the electrolytic part having the slot and the electrode case lid and the liquid flows only along the flow path over the electrolytic part, the electrodes are made up of an anode and a cathode, the electrolytic part further includes an anode power-feeding shaft electrically connected to the anode to apply a voltage to the anode and a cathode power-feeding shaft electrically connected to the cathode to apply a voltage to the cathode, the anode power-feeding shaft and the cathode power-feeding shaft extend along the lamination direction, and one of the anode power feeding shaft and the cathode power-feeding shaft is disposed on a section of the electrolytic part adjacent to the inlet, and the other of the anode power feeding shaft and the cathode power-feeding shaft is disposed on a section of the electrolytic part adjacent to the outlet.

10. The electrolytic liquid generation device according to claim 9, wherein the electrolytic part is substantially rectangular when viewed along the lamination direction, with a lengthwise direction of the electrolytic part aligned with the liquid flowing direction, and the anode power-feeding shaft and the cathode power-feeding shaft are disposed on diagonally opposite sections of the electrolytic part.

11. The electrolytic liquid generation device according to claim 7, wherein at least one of the anode power feeding shaft and the cathode power-feeding shaft is provided separately from the respective electrodes.

12. An electrolytic liquid generation device comprising:

an electrolytic part comprising a laminate, the laminate including electrodes and an ion exchange film interposed between the electrodes; and a housing in which the electrolytic part is disposed, wherein:

in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, and the electrolytic part is disposed in the recess of the electrode case in such a manner that the lamination direction of the laminate is substantially aligned with a direction in which the opening opens, and at least one of the electrodes of the electrolytic part is bent in the lamination direction.

13. An electrolytic liquid generation device comprising:

an electrolytic part comprising a laminate, the laminate including electrodes and an ion exchange film interposed between the electrodes; and a housing in which the electrolytic part is disposed, wherein:

in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, the flow path is formed between the electrolytic part having the slot and the electrode case lid and the liquid flows only along the flow path over the electrolytic part, the slot is formed in such a manner that a depth of the slot is less than at least one of an opening length of the slot in the liquid flowing direction and a height of the flow path in the lamination direction, and a plurality of slots are provided with a constant pitch along the liquid flowing direction.

14. An electrolytic liquid generation device comprising:
an electrolytic part comprising a laminate, the laminate including electrodes and an ion exchange film interposed between the electrodes; and
a housing in which the electrolytic part is disposed, wherein:
in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, the flow path is formed between the electrolytic part having the slot and the electrode case lid and the liquid flows only along the flow path over the electrolytic part, and the flow path is disposed on outside the electrolytic part and formed in such a manner that a height of the flow path along the lamination direction is less than a width of the flow path.

15. An electrolytic liquid generation device comprising:
an electrolytic part comprising a laminate, the laminate including electrodes and an ion exchange film interposed between the electrodes; and
a housing in which the electrolytic part is disposed, wherein:
in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, the flow path is formed between the electrolytic part having the slot and the electrode case lid and the liquid flows only along the flow path over the electrolytic part, and a projection is provided on the electrode case lid and is in contact with a surface of the electrolytic part adjacent to the flow path.

16. The electrolytic liquid generation device according to claim 15, wherein the projection is formed midway between edges of the flow path in a widthwise direction of the flow path.

17. The electrolytic liquid generation device according to claim 15, wherein a plurality of the projections are provided on the electrode case lid and arranged side by side along the liquid flowing direction.

18. An electrolytic liquid generation device comprising:
an electrolytic part comprising a laminate, the laminate including electrodes and an ion exchange film interposed between the electrodes; and
a housing in which the electrolytic part is disposed, wherein:
in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, a projection is provided on the electrode case lid and is in contact with a surface of the electrolytic part adjacent to the flow path, and the projection is formed in such a manner that at least a contact portion of the projection in contact with the electrolytic part overlaps no slot in the lamination direction.

19. An electrolytic liquid generation device comprising:

an electrolytic part comprising a laminate, the laminate including electrodes and an ion exchange film interposed between the electrodes; and a housing in which the electrolytic part is disposed, wherein:

in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, a projection is provided on the electrode case lid and is in contact with a surface of the electrolytic part adjacent to the flow path, a plurality of slots are provided on the electrolytic part and are arranged side by side along the liquid flowing direction, and at least a contact portion of the projection in contact with the electrolytic part has a length less than a length between slots adjacent to each other in the electrolytic part in the liquid flowing direction.

20. An electrolytic liquid generation device comprising:

an electrolytic part comprising a laminate, the laminate including electrodes and an ion exchange film interposed between the electrodes; and a housing in which the electrolytic part is disposed, wherein:

in the housing, a flow path is formed in such a manner that a liquid flowing direction intersects with a lamination direction of the laminate, the flow path has an inlet and an outlet in which the inlet communicates with an external flow path located upstream to allow a liquid to flow into the inlet and be fed to the electrolytic part and the outlet communicates with an external flow path located downstream to allow an electrolytic liquid produced at the electrolytic part to flow out from the outlet, the electrolytic part has a slot that is open to the flow path and that is formed in such a manner that at least a part of interfaces between the ion exchange film and the respective electrodes is exposed to the slot, the housing includes an electrode case, the electrode case comprising an electrode case lid and a recess, the recess having an opening configured to enable insertion of the electrolytic part through the opening, the electrode case lid covering the opening, the electrolytic part is disposed in the recess of the electrode case in such a manner that the lamination direction of the laminate is substantially aligned with a direction in which the opening opens, a projection is provided on the electrode case lid and is in contact with a surface of the electrolytic part adjacent to the flow path, and the projection is formed in such a manner that a contour of the projection viewed along the lamination direction is a polygon with rounded edges formed at apexes of the projection.

\* \* \* \* \*